(12) United States Patent
Ichihara et al.

(10) Patent No.: US 10,230,882 B2
(45) Date of Patent: Mar. 12, 2019

(54) IMAGE PICKUP APPARATUS ACQUIRING A PLURALITY OF IN-FOCUS IMAGES OF DIFFERENT FIELD ANGLES

(71) Applicant: CANON KABUSHIKI KAISHA, Tokyo (JP)

(72) Inventors: Ko Ichihara, Toride (JP); Chiaki Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/834,731

(22) Filed: Dec. 7, 2017

(65) Prior Publication Data

US 2018/0176436 A1    Jun. 21, 2018

(30) Foreign Application Priority Data

Dec. 16, 2016 (JP) .................... 2016-244431

(51) Int. Cl.
*H04N 5/225* (2006.01)
*H04N 5/262* (2006.01)
*H04N 5/232* (2006.01)

(52) U.S. Cl.
CPC ......... *H04N 5/2259* (2013.01); *H04N 5/2258* (2013.01); *H04N 5/2628* (2013.01); *H04N 5/23296* (2013.01)

(58) Field of Classification Search
CPC .................................................. H04N 5/2259
See application file for complete search history.

(56) References Cited

U.S. PATENT DOCUMENTS

| 8,988,538 B2 * | 3/2015 | Inoue ................. H04N 5/23296 348/218.1 |
| 2010/0277619 A1 * | 11/2010 | Scarff .................. H04N 5/2258 348/240.1 |
| 2014/0002688 A1 | 1/2014 | Inoue et al. |
| 2015/0145958 A1 * | 5/2015 | Inoue ..................... G03B 35/04 348/46 |
| 2017/0332067 A1 * | 11/2017 | Ichihara ................. G06T 7/596 |

* cited by examiner

*Primary Examiner* — Gary C Vieaux
(74) *Attorney, Agent, or Firm* — Canon U.S.A., Inc. I.P. Division

(57) ABSTRACT

At least one image pickup apparatus includes an image pickup unit which photoelectrically converts object images formed by plural image pickup optical systems of different focal lengths. If an image plane most separated from an object side among the image planes of the plural image pickup optical systems is defined as a reference image plane, a longest distance among distances from a reference image plane to each of entrance pupil planes of the plurality of image pickup optical systems is defined as EPmax, a shortest distance among distances from the reference image plane to each of the entrance pupil planes of the plural image pickup optical systems is defined as EPmin, and a 35 mm equivalent focal length of an image pickup optical system having the longest focal length among a plurality of image pickup optical systems is defined as $f_{tele35}$, then EPmax, EPmin, and $f_{tele35}$ satisfy a predetermined condition.

14 Claims, 24 Drawing Sheets

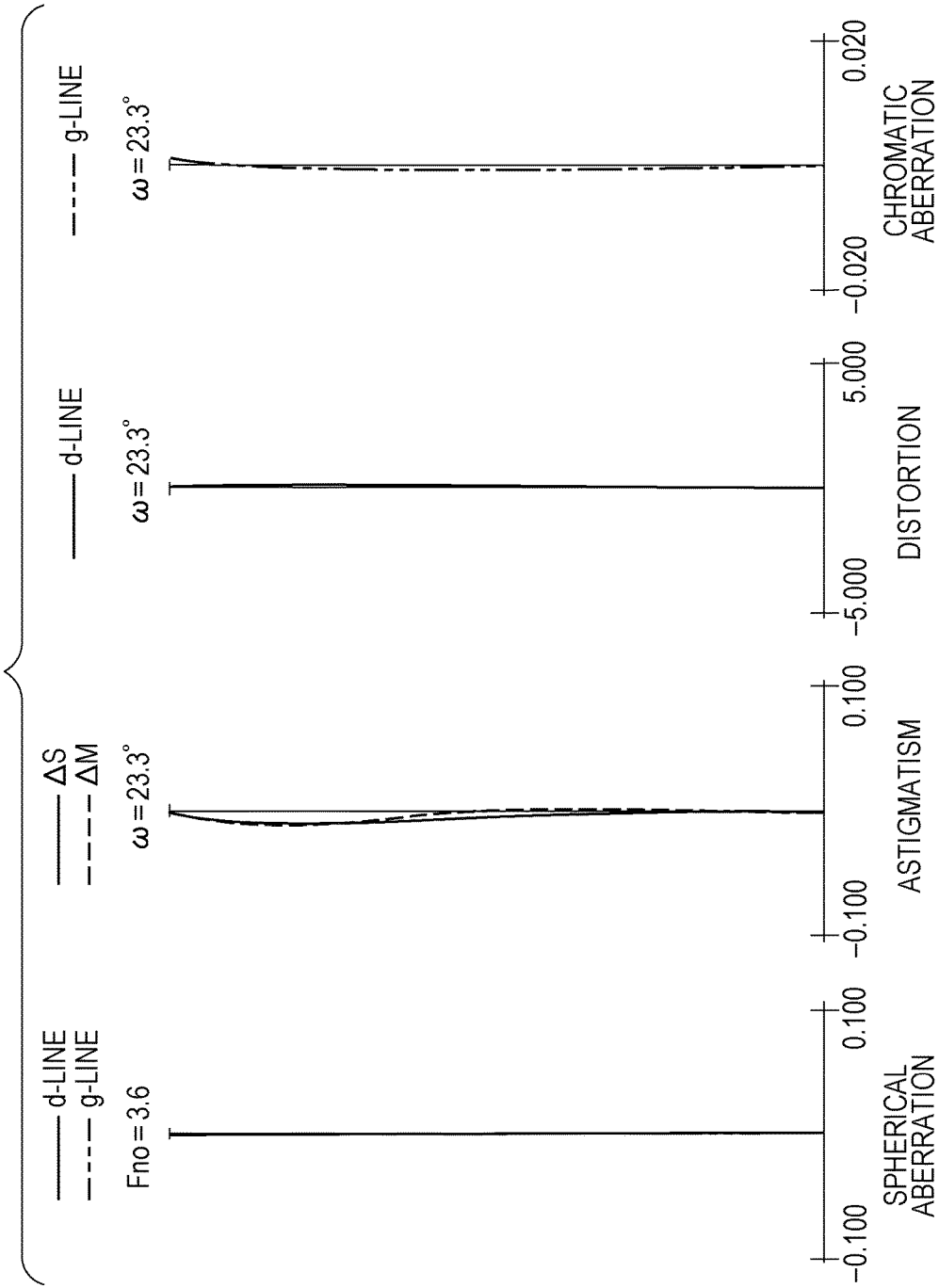

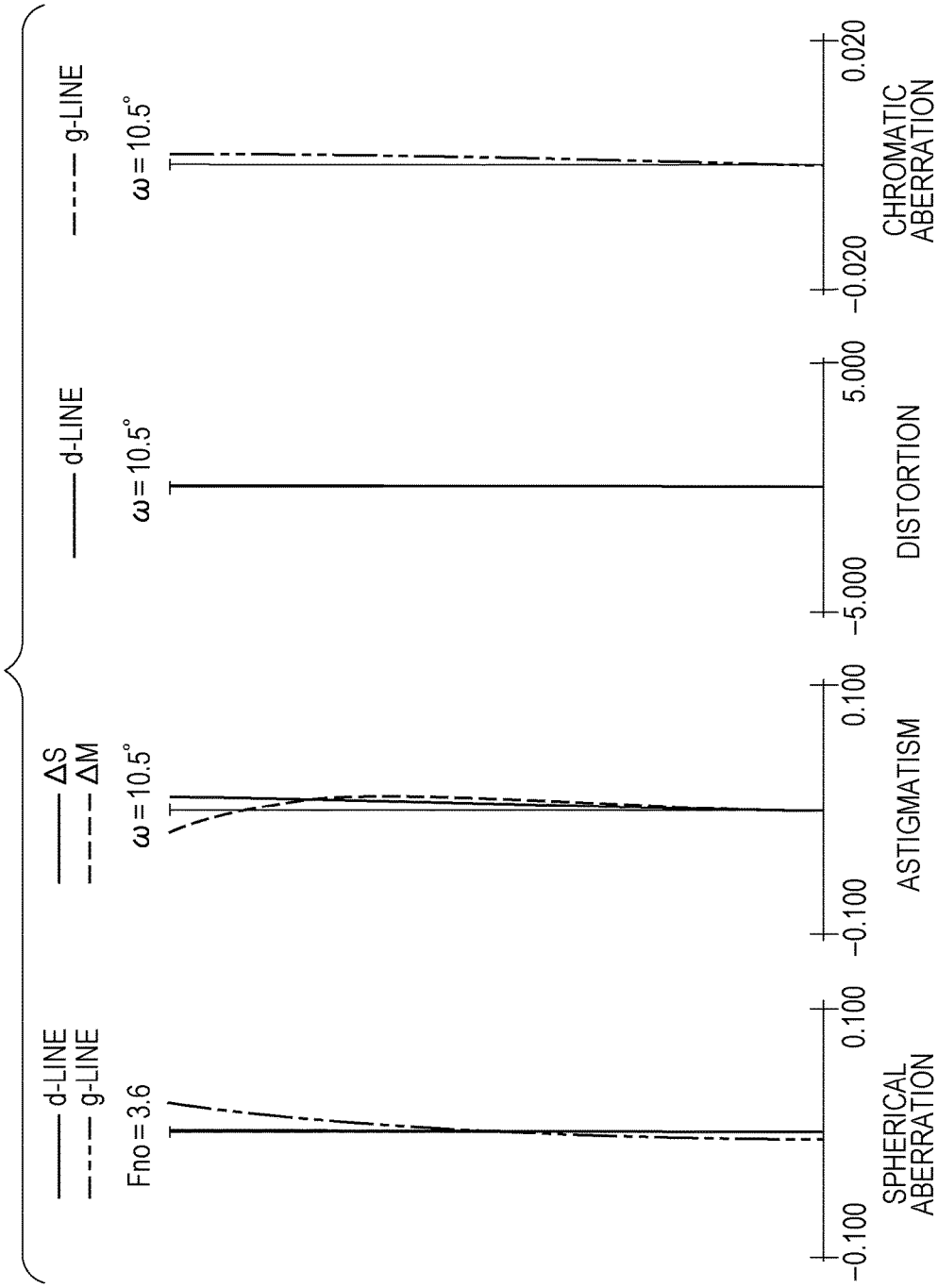

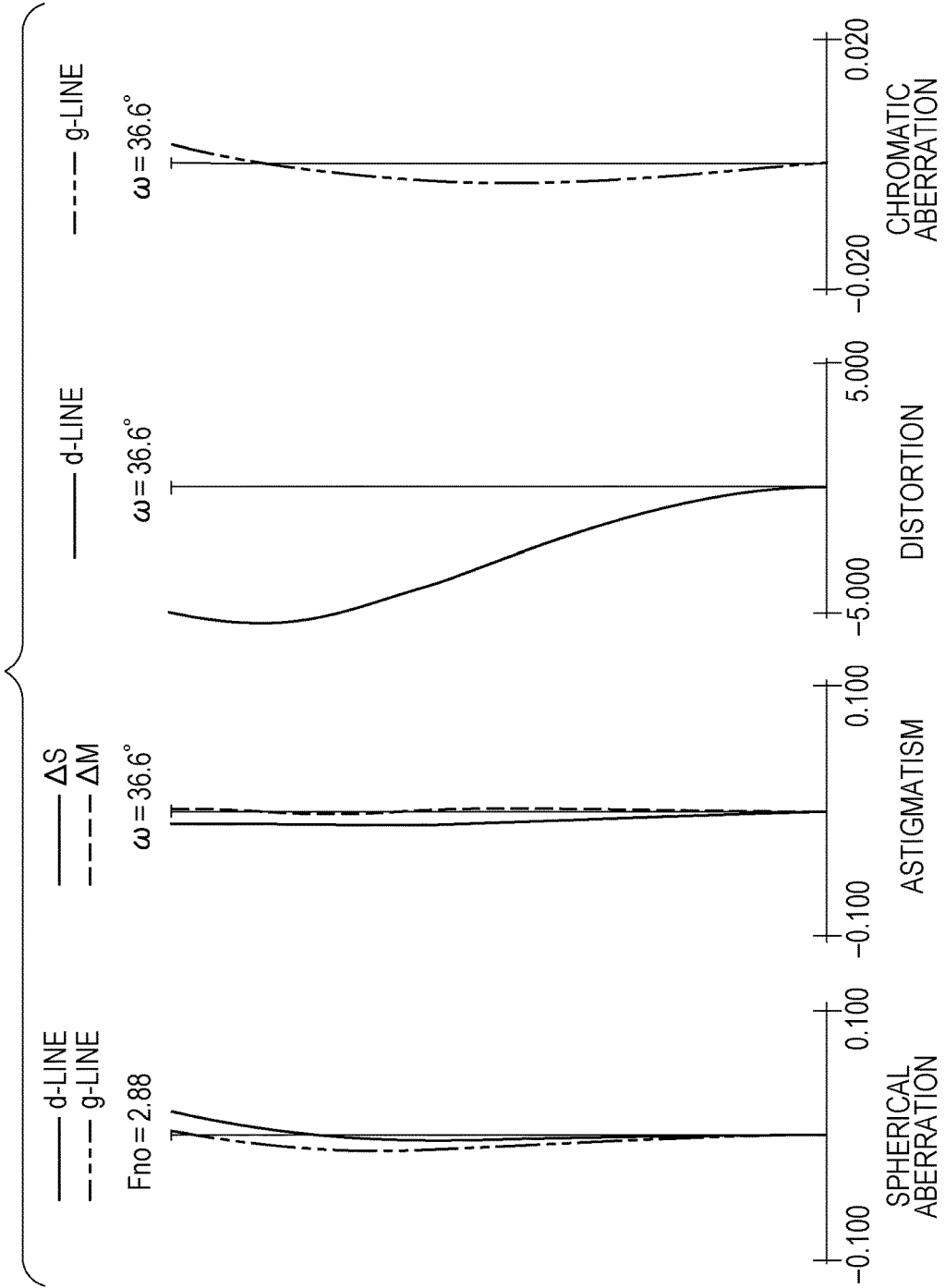

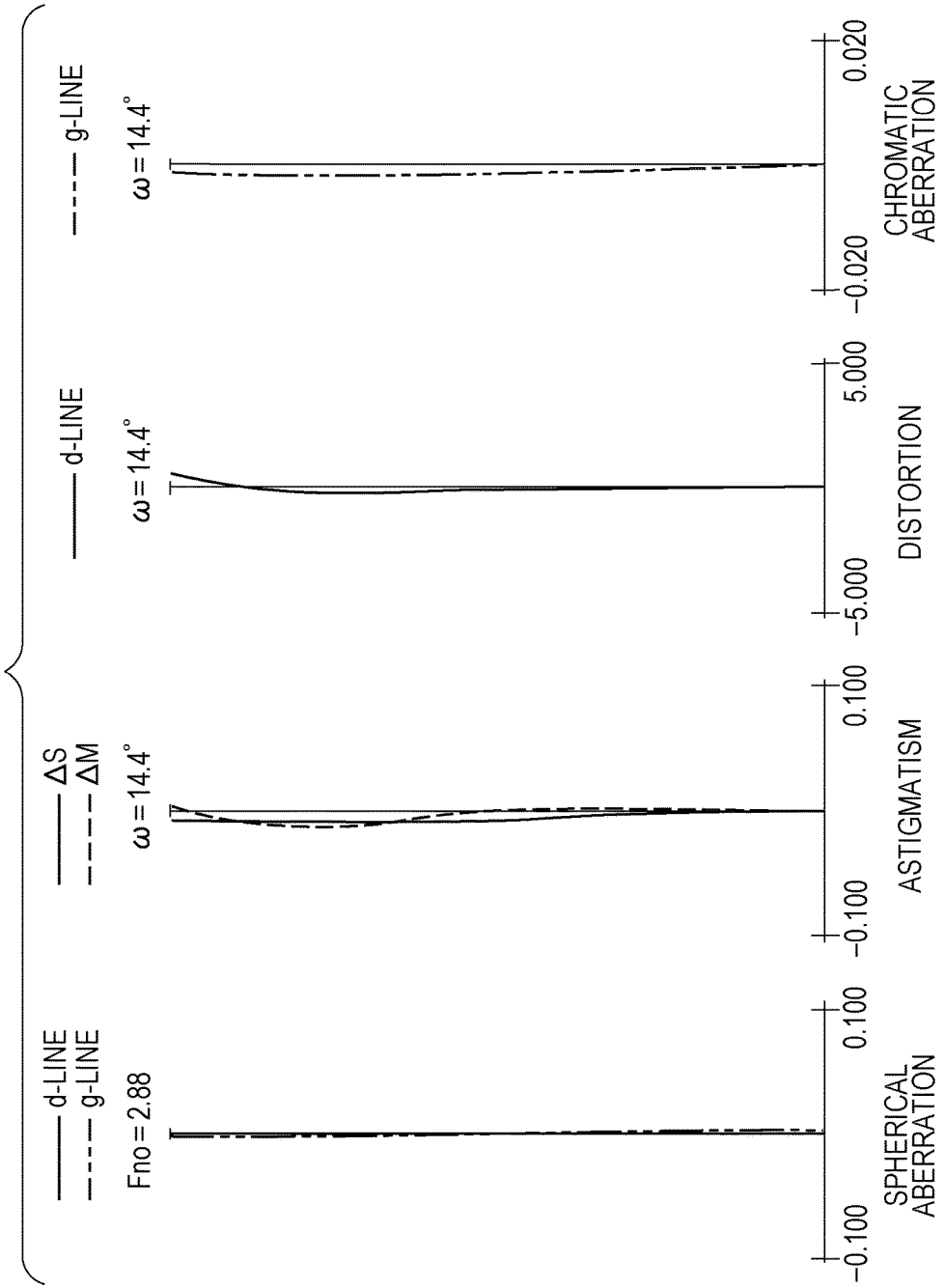

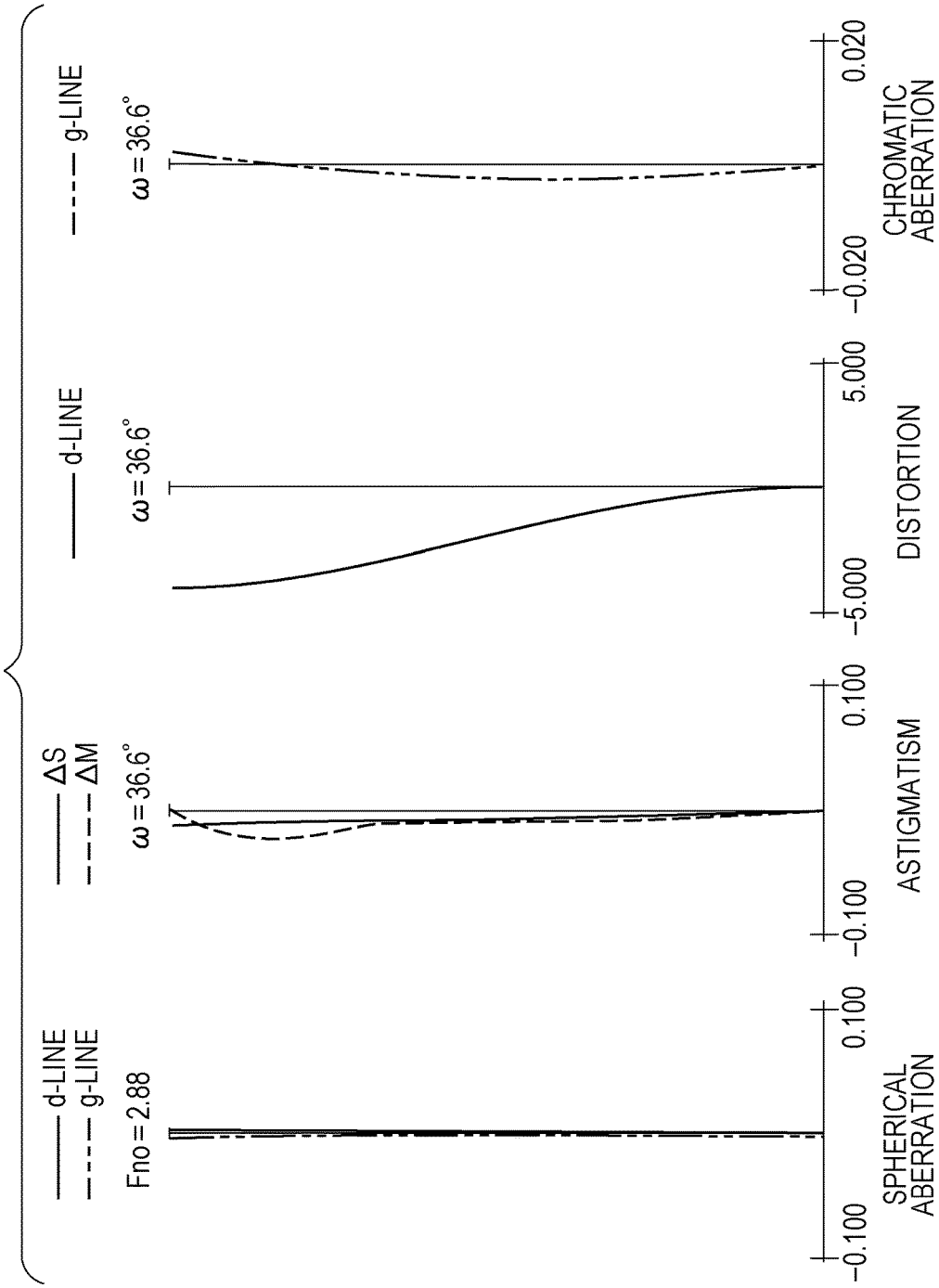

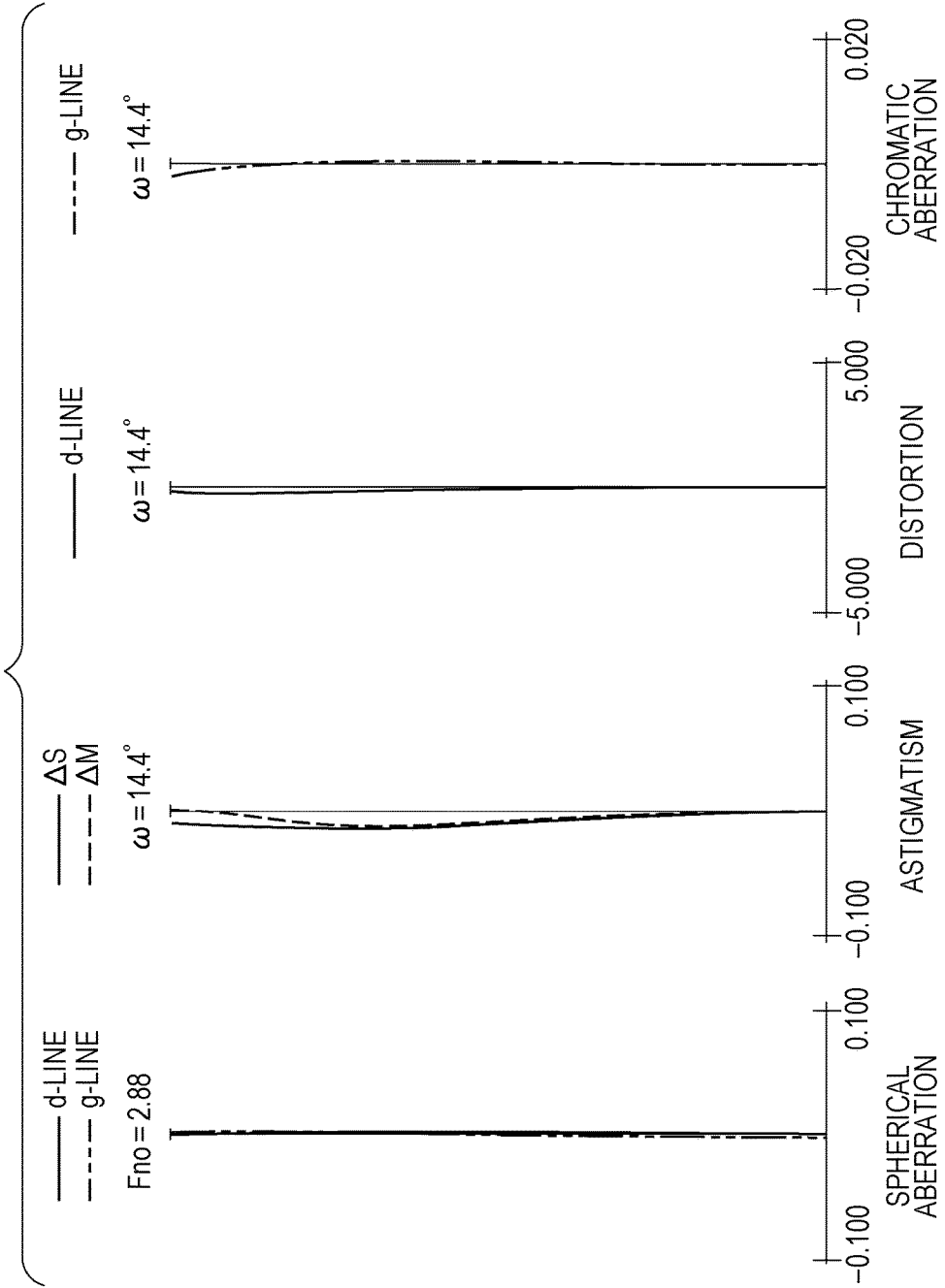

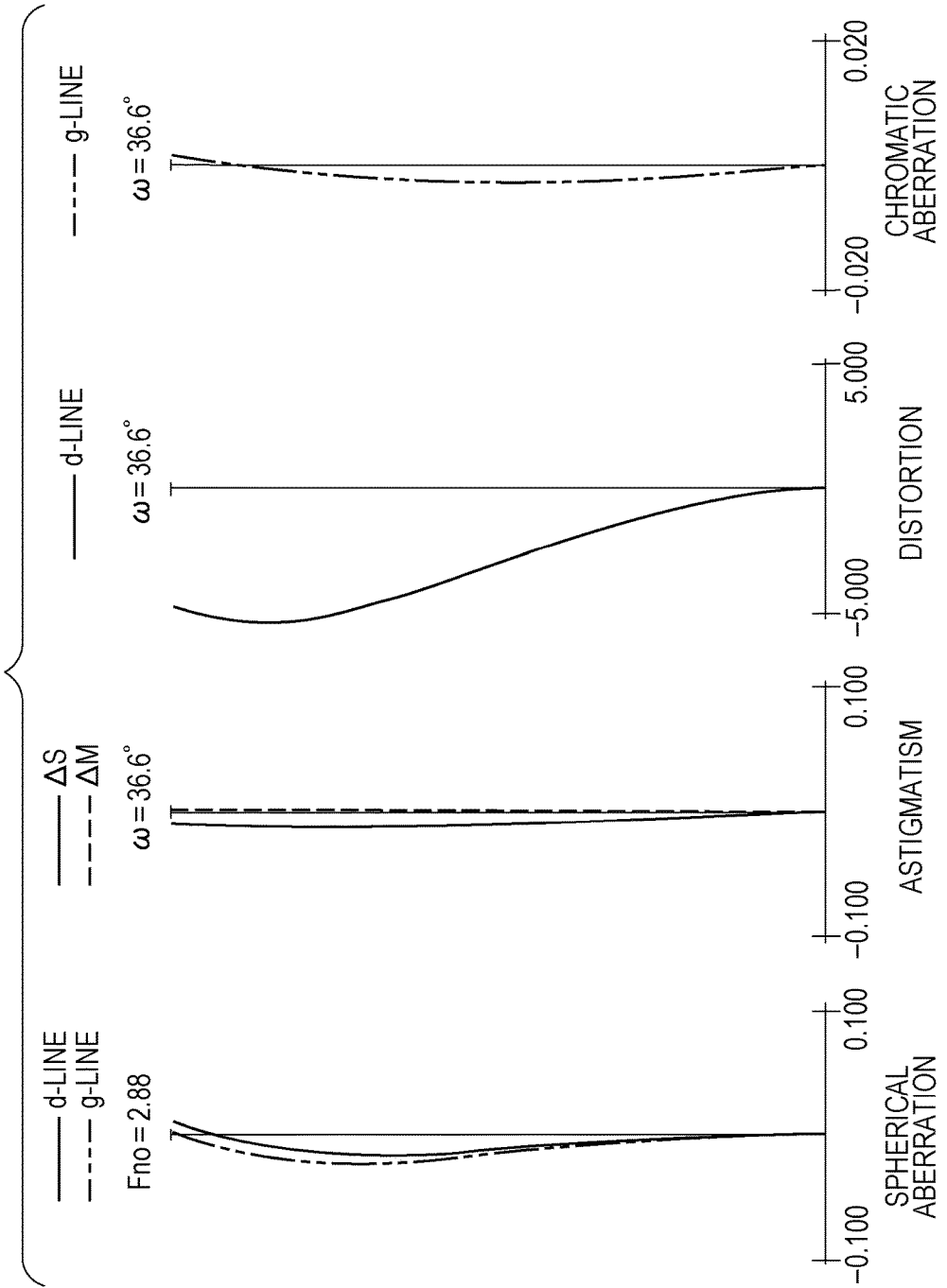

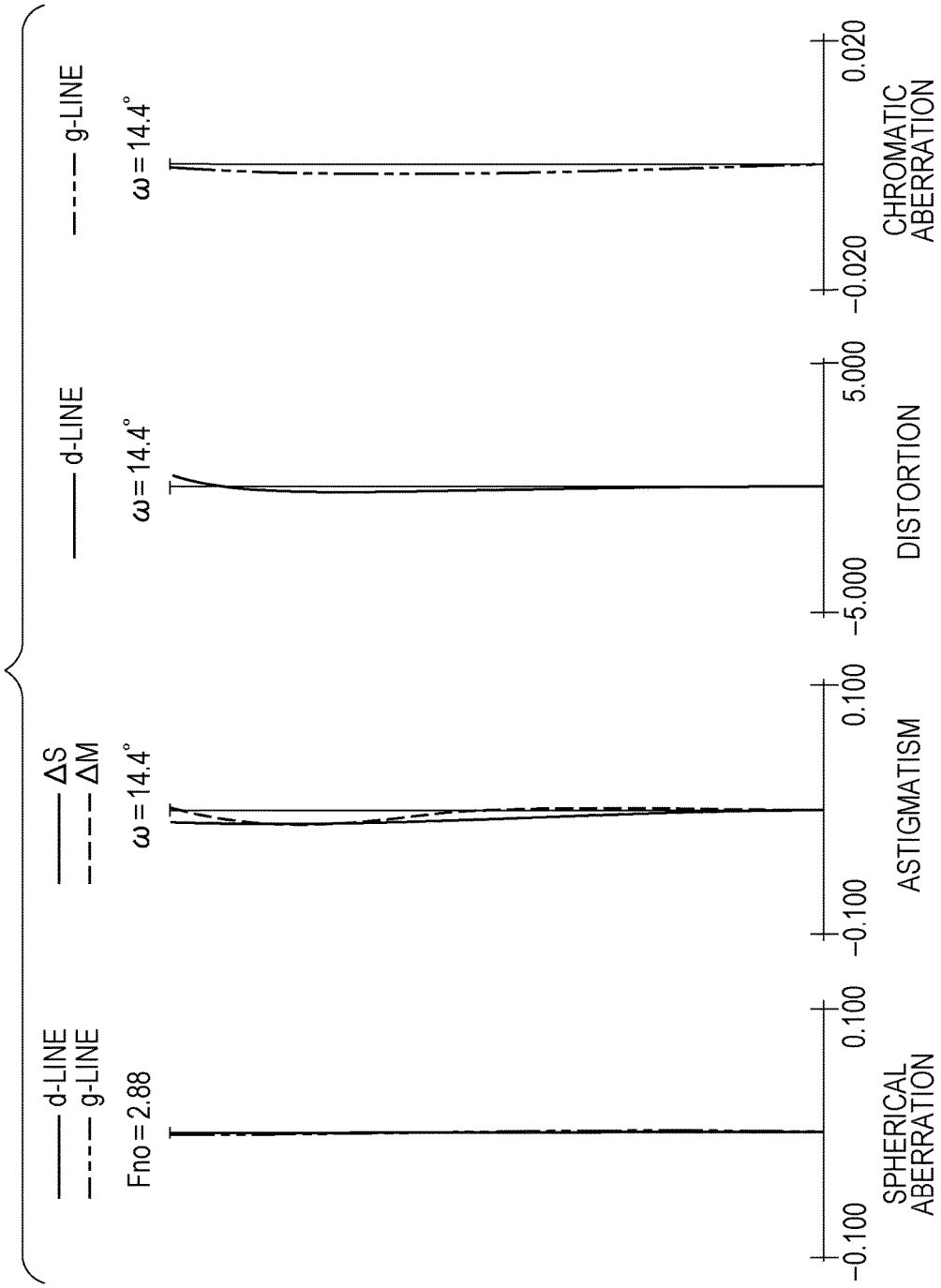

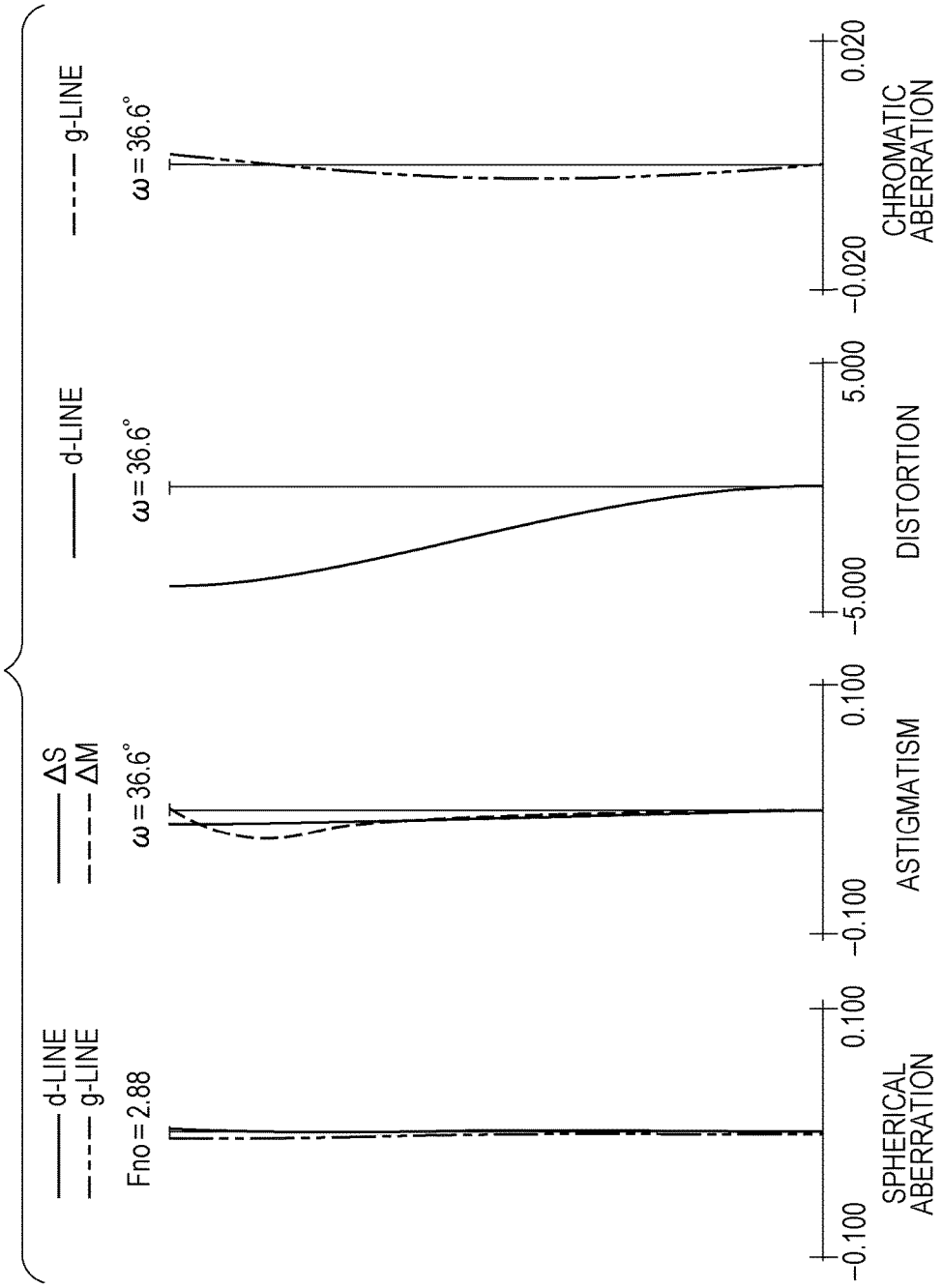

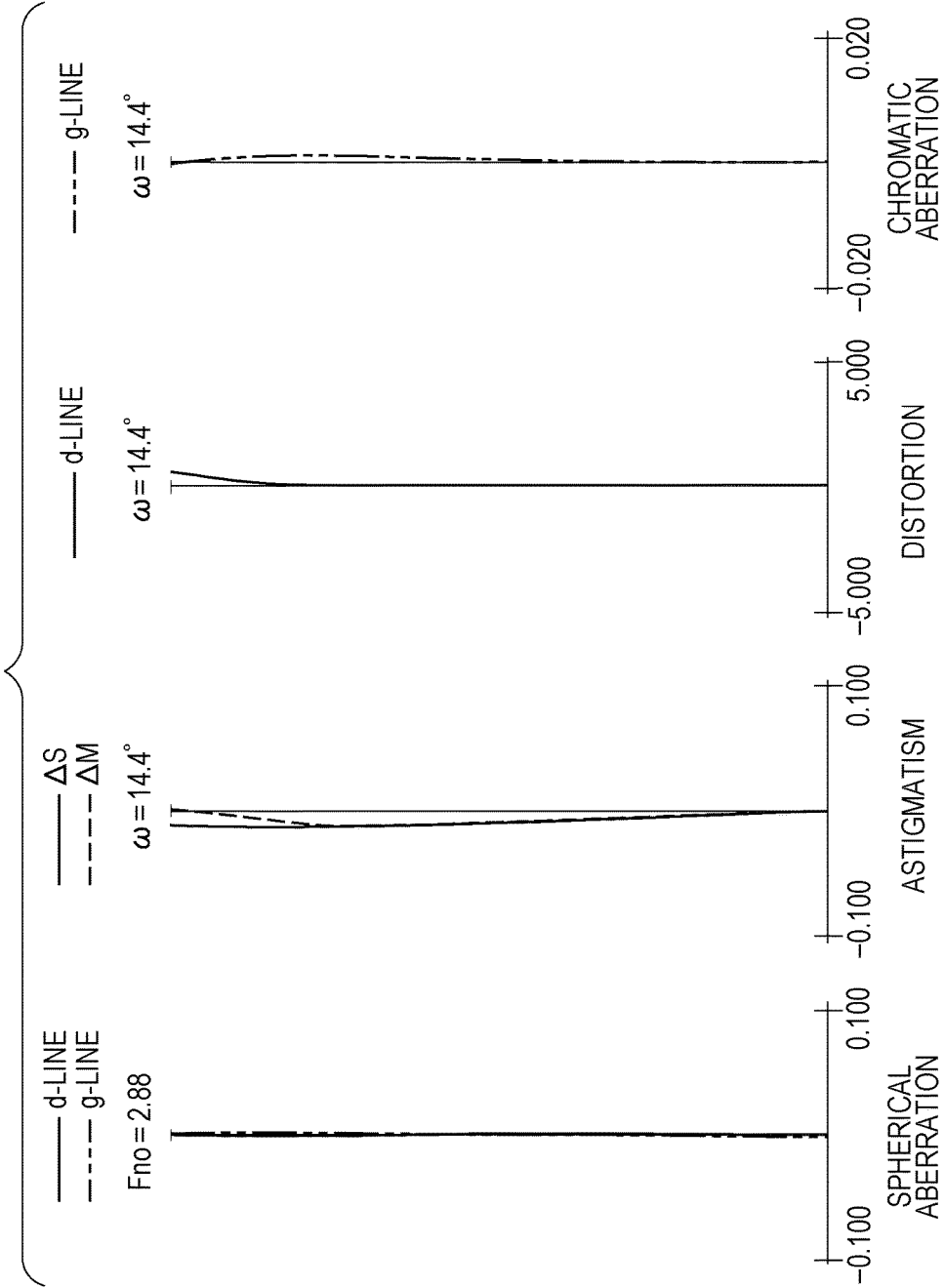

IMAGE PICKUP APPARATUS ACQUIRING A PLURALITY OF IN-FOCUS IMAGES OF DIFFERENT FIELD ANGLES

BACKGROUND OF THE INVENTION

Field of the Invention

The present disclosure relates to at least one embodiment of a binocular image pickup apparatus provided with a plurality of image pickup optical systems.

Description of the Related Art

As a binocular image pickup apparatus provided with a plurality of image pickup optical systems which focus an optical image of an object (an object image) on an image pickup element, U.S. Patent Application Publication No. 2014/0002688 discloses an apparatus which simultaneously acquires a plurality of in-focus images of different field angles via a plurality of fixed focal length image pickup optical systems of different focal lengths.

SUMMARY OF THE INVENTION

The present disclosure provides an image pickup apparatus capable of simultaneously acquiring a plurality of images of different field angles, and acquiring a plurality of images of the same object magnification in an entire image area from the plurality of images.

An aspect of at least one embodiment is an image pickup apparatus which includes an image pickup unit configured to perform photoelectric conversion of object images formed by a plurality of image pickup optical systems of different focal lengths. If an image plane most separated from an object side among the image planes of the plurality of image pickup optical systems is defined as a reference image plane, a longest distance among distances from a reference image plane to each of entrance pupil planes of the plurality of image pickup optical systems is defined as EPmax, a shortest distance among distances from the reference image plane to each of the entrance pupil planes of the plurality of image pickup optical systems is defined as EPmin, and a 35 mm equivalent focal length of an image pickup optical system having the longest focal length among a plurality of image pickup optical systems is defined as $f_{tele35}$, then conditions of later-described Expression (7) will be satisfied.

Another aspect of at least one embodiment is an image pickup apparatus in which a focal length of an image pickup optical system which has a longest focal length among the plurality of image pickup optical systems is defined as $f_{tele}$, and for which conditions of later-described Expression (8) will be satisfied.

According to other aspects of the present disclosure, one or more additional image pickup apparatuses are discussed herein. Further features of the present disclosure will become apparent from the following description of exemplary embodiments with reference to the attached drawings.

BRIEF DESCRIPTION OF THE DRAWINGS

FIGS. 10A to 10C are aberration charts of the wide monocular image pickup apparatus, the middle monocular image pickup apparatus, and the telescopic image pickup apparatus, respectively, of the numerical embodiment 1.

FIGS. 12A and 12B are aberration charts of the wide monocular image pickup apparatus and the telescopic image pickup apparatus, respectively, of the numerical embodiment 2.

FIGS. 14A and 14B are aberration charts of the wide monocular image pickup apparatus and the telescopic image pickup apparatus, respectively, of the numerical embodiment 3.

FIGS. 16A and 16B are aberration charts of the wide monocular image pickup apparatus and the telescopic image pickup apparatus, respectively, of the numerical embodiment 4.

FIGS. 18A and 18B are aberration charts of the wide monocular image pickup apparatus and the telescopic image pickup apparatus, respectively, of the numerical embodiment 5.

DESCRIPTION OF THE EMBODIMENTS

Hereinafter, embodiments of the present disclosure will be described with reference to the drawings.

An image pickup apparatus of each embodiment described later includes a plurality of fixed focal length image pickup optical systems of different focal lengths as image pickup optical systems, and includes an image pickup unit having a plurality of image pickup areas each corresponding to each fixed focal length optical system, thereby implementing continuous zooming. The image pickup unit may be constituted by a plurality of image pickup elements (image pickup areas) corresponding to each fixed focal length optical system, or may be constituted by segmenting a single image pickup element into a plurality of image pickup areas.

The image pickup apparatus of each embodiment simultaneously picks up a plurality of images of different field angles in order to implement continuous zooming. At this time, field angles among field angles of a plurality of fixed focal length image pickup optical systems are interpolated by digital zooming which provides the same effect as that of zooming in a pseudo manner by trimming a part of an image acquired by imaging and enlarging the trimmed range. That is, using a plurality of first images of different field angles generated by the image pickup unit, a second image having a field angle different from field angles of the plurality of first images is generated.

In each embodiment, an image of intermediate field angle of which resolution is high in some parts and low in other parts is acquired by composing a telescopic image acquired through an image pickup optical system on a telescopic side into a part of an image acquired by digital zooming. That is, the second image is generated by composing an image obtained by trimming a part of a first image having a field angle greater than the field angle of the second image and an image obtained by reducing from a first image having a field angle smaller than the field angle of the second image among a plurality of first images.

In each embodiment, information about depth of an object (hereinafter, referred to as "depth information") is calculated using a plurality of images of different field angles.

Hereinafter, details of a process for obtaining an intermediate field angle image with a simple process will be described with reference to FIGS. 2A to 2I. Here, a process to be executed by a binocular image pickup apparatus provided with three image pickup optical systems of different focal lengths illustrated in FIG. 2A will be described as an example. CW, CM, and CT in FIG. 2A denote image pickup optical systems of different focal lengths. CW denotes an image pickup optical system having the shortest focal length, CT denotes an image pickup optical system having the longest focal length, and CM denotes an image pickup optical system having a focal length between CW and CT. Optical axes of the image pickup optical systems CW, CM, and CT are parallel with one another.

Figure 2A:
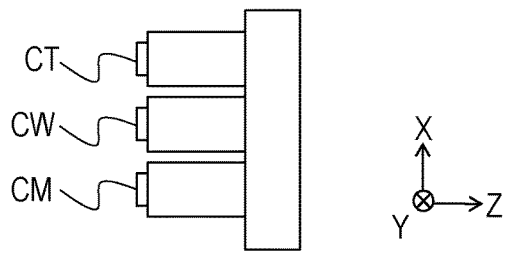
FIGS. 2A to 2I illustrate a process for generating an intermediate field angle image using a plurality of images of different field angles.
Figure 2B:
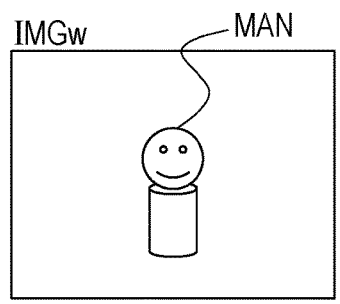
Figure 2C:
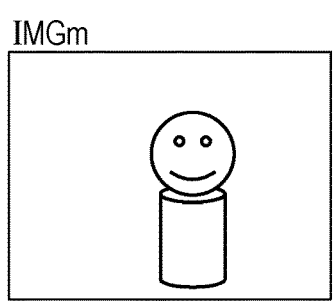
Figure 2D:
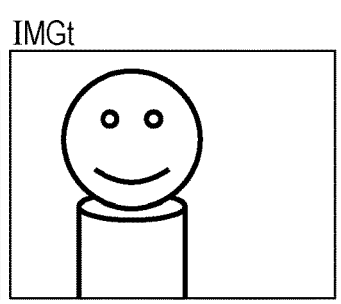

FIGS. 2B, 2C, and 2D illustrate images acquired by imaging scenes including an object MAN using the image pickup optical systems CW, CM, and CT, respectively, and each image is referred to as IMGw, IMGm, and IMGt. A lengthwise direction of the image corresponds to a Y direction and a horizontal direction of the image corresponds to an X direction in FIG. 2A. All of these images have the same number of pixels N. These images have different field angles and object magnifications since the image pickup optical systems CW, CM, and CT have different focal lengths. The object MAN is located at the center of the image in the image IMGw, whereas the object MAN is not located at the center of the images in the images IMGm and IMGt because the image pickup optical systems CW, CM, and CT are disposed at different positions. Here, for the description, an ideal state is assumed that all the objects corresponding to the object images in these three images are located at the same distance from the image pickup apparatus, and these images have the same resolution. Hereinafter, an image IMGim of an intermediate field angle between the field angle of the image pickup optical system CW and the field angle of the image pickup optical system CM will be generated using these three images.

Figure 2E:
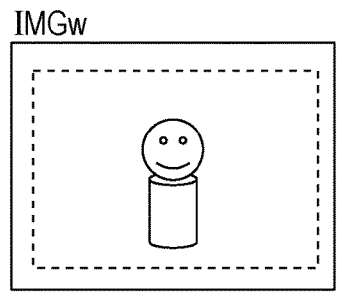
Figure 2F:
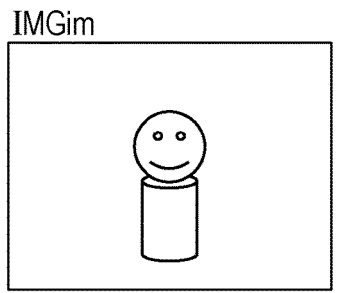

First, a process for generating the intermediate field angle image by trimming a part of an image acquired by imaging will be described. FIG. 2E illustrates the image IMGw as well as FIG. 2B, in which the broken line depicts an area on the image corresponding to the intermediate field angle to be generated. By extracting the area depicted by the broken line on the image IMGw and enlarging the area to the same size as that of the image IMGw, the intermediate field angle image IMGim having the number of pixels N illustrated in FIG. 2F can be generated. When generating an image having the number of pixels N is to be generated from the extracted image of which number of pixels is smaller than N, a publicly known pixel interpolation process, such as bilinear interpolation, is used. Since the image IMGim is generated from an image of which number of pixels is smaller than N, the image IMGim is an image of low resolution.

Figure 2G:
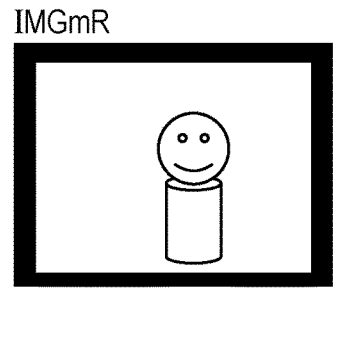
Figure 2H:
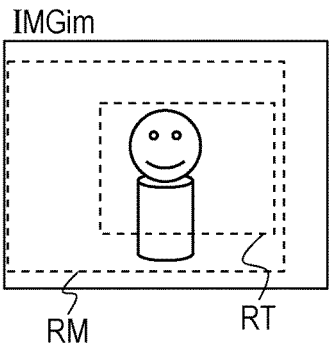

Next, a process for increasing resolution of a part of the intermediate field angle image using an image of a field angle closer to the telescopic field angle than the intermediate field angle will be described. FIG. 2G is an image IMGmR obtained by reducing from the image IMGm so that object magnification on the image after reduction becomes the same as that of the image IMGim. The number of pixels of the image IMGmR is N. A black area on the image IMGmR is a pixel area in which no information exists because it is located outside the field angle of the image IMGm. In the black area, a pixel value is set to 0, for example. FIG. 2H illustrates the image IMGim and an area surrounded by a broken line RM depicts an image area corresponding to a viewing angle area of the image IMGm.

Since the image area inside the black area on the images IMGmR is an area in which the number of pixels generated using an image of the number of pixels N is smaller than N, the image area has higher resolution compared with the image area surrounded by the broken line RM on the image IMGim. Therefore, by performing a process for fitting the image area inside the black area on the image IMGmR into the image area surrounded by the broken line RM on the image IMGim, the resolution of the image area surrounded by the broken line RM on the image IMGim can be improved. Detail of this fitting process will be described later.

Figure 2I:
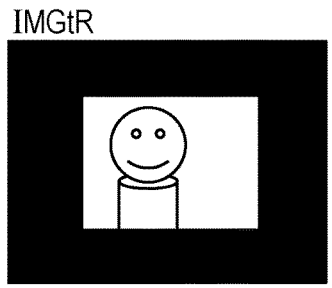

FIG. 2I illustrates an image IMGtR obtained by reducing from the image IMGt so that object magnification on the image after reduction becomes the same as that of the image IMGim. The area surrounded by the broken line RT on the image IMGim illustrated in FIG. 2H depicts an image area corresponding to the image IMGt on the image IMGim. In the same manner in which a part of resolution of the image IMGim has been improved using the image IMGm, a process for fitting the image area inside the black area on the image IMGtR into the image area surrounded by the broken line RT on the image IMGim is performed. In this manner, resolution of the image area surrounded by the broken line RT on the image IMGim can be further improved.

With the process above, the intermediate field angle image of which resolution is high in some parts and low in other parts can be generated with a simple process using a plurality of images of different field angles.

Figure 3:
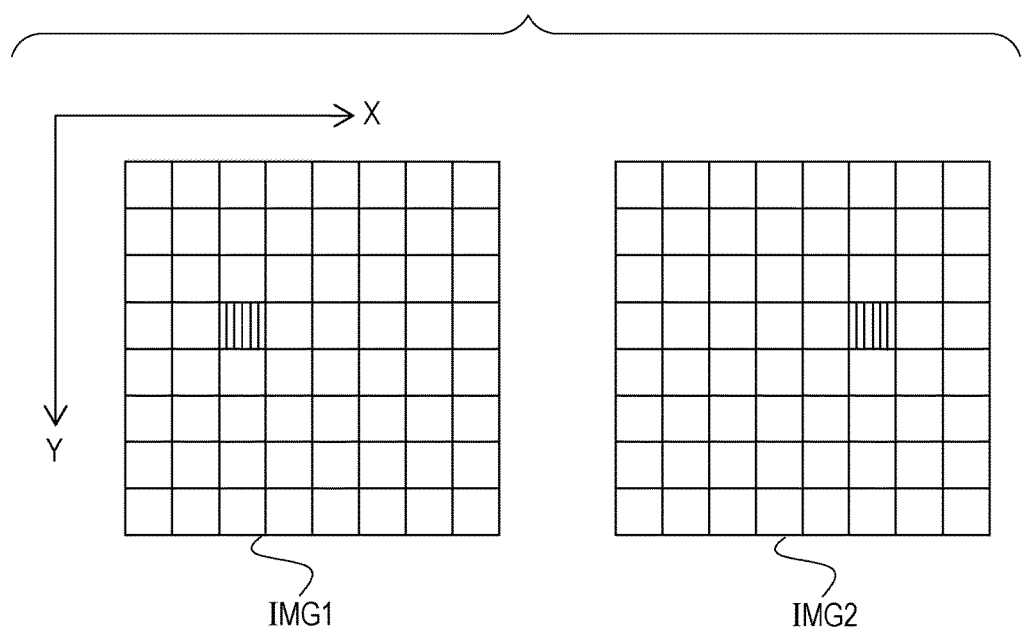
FIG. 3 illustrates a corresponding point extracting process.

Next, details of the fitting process of the pixel area described above will be described. First, an example of an extraction technique of corresponding object areas between a typical image IMG1 and a typical image IMG2 will be described with reference to FIG. 3. In image coordinates (X, Y) used in the description here, an upper left point of each pixel group in FIG. 3 is defined as an origin point, a horizontal direction is defined as an X direction, and a vertical direction is defined as a Y direction. A pixel value at the image coordinates (X, Y) of the image IMG1 is defined as F1(X, Y), and a pixel value of a parallax image IMG2 is defined as F2(X, Y).

The pixel of the parallax image IMG2 corresponding to arbitrary coordinates (X, Y) in the image IMG1 can be obtained by searching a pixel value of the IMG2 most similar to the pixel value F1(X, Y) of the image IMG1 at the coordinates (X, Y). The hatched pixels on the images IMG1 and IMG2 in FIG. 3 correspond to each other. However, since it is generally difficult to search the pixel that is most similar to an arbitrary pixel, a similar pixel will be searched by a technique called "block matching" also using pixels near the image coordinates (X, Y).

As an example, block matching in a case in which a block size is 3 will be described. The pixel values of the three pixels of an arbitrary coordinates (X, Y) on the image IMG1, and two coordinates (X−1, Y) and (X+1, Y) before and after the coordinates (X, Y) are F1(X, Y), F1(X−1, Y), and F1(X+1, Y), respectively.

The pixel values of the pixels shifted by k from the coordinates (X, Y), (X−1, Y), and (X+1, Y), respectively, in the image IMG2 in the X direction are F2(X+k, Y), F2(X+k−1, Y), and F2(X+k+1, Y), respectively. Similarity E with the pixel of the coordinates (X, Y) in the image IMG1 is defined by the following Expression (1).

$$E = [F1(X, Y) - F2(X+k, Y)] + [F1(X-1, Y) - F2(X+k-1, Y)] + [F1(X+1, Y) - F2(X+k+1, Y)] = \sum_{j=-1}^{1} [F1(X+j, Y) - F2(X+k+j, Y)] \quad (1)$$

In Expression (1), a value of the similarity E is calculated while sequentially changing a value of k, and coordinates (X+k, Y) which provides the smallest similarity E are defined as corresponding pixels (corresponding points) on the image IMG2 with respect to the coordinates (X, Y) on the image IMG1.

Figure 4A:
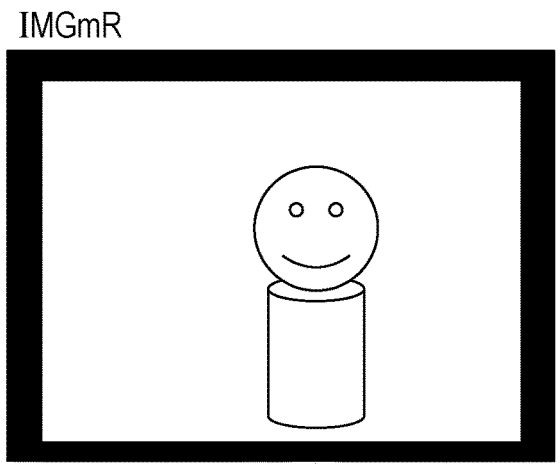
FIGS. 4A to 4C illustrate a fitting process of an image area.
Figure 4B:
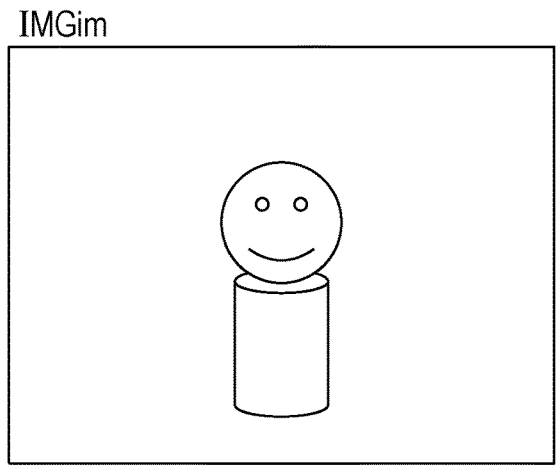

Next, the fitting process will be described in detail. FIG. 4A illustrates the image IMGmR and FIG. 4B illustrates the image IMGim. The corresponding points are extracted between the image IMGmR and the image IMGim using block matching described above. Here, the corresponding points to be extracted may be arbitrary numbers of points located at arbitrary positions. For example, four densely structured points in the pixel area on the image IMGmR may be selected and points corresponding to them on the image IMGim may be extracted.

Figure 4C:
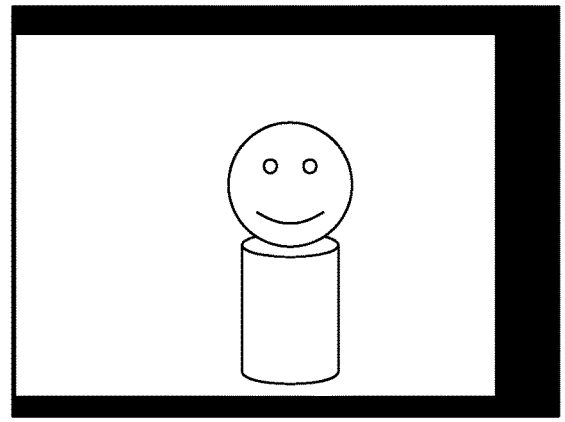

The image IMGmR and the image IMGim are the same in object magnification. The image pickup optical systems used to acquire the image IMGmR and the image IMGim are disposed at different positions and optical axes of these image pickup optical systems are parallel with each other. Therefore, the value of k calculated at each of four corresponding points are ideally the same. That is, as illustrated in FIG. 4C, in an image in which the image IMGmR is shifted in parallel by the k pixels and in the image IMGim, the same pixel address represents the same object in the black area. If the k calculated at each of the four corresponding points differs due to an influence of noise, etc., a mean of K may be calculated and the image IMGmR may be shifted in parallel by K pixels. By replacing a pixel value in the image area inside the black area in the image IMGmR shifted in parallel with a pixel value of the same pixel address on the image IMGim, a high resolution image may be fit into a corresponding area of a low resolution image of different field angle to increase resolution of the corresponding area.

The fitting process described above replaces the pixel value of the same pixel address on the image IMGmR and the image IMGim which are shifted in parallel with each other, however, a sum of each weighed value of the pixel values of the image IMGmR and the image IMGim may be defined as the pixel value of the image IMGim.

Next, an influence caused by different perspectives of a plurality of images of different field angles used in the process for increasing resolution will be described. Here, the term "perspective" refers to a rate of change of the object magnification with respect to an object distance.

Figure 5A:
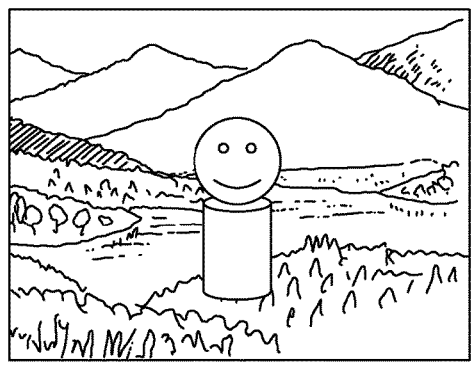
FIGS. 5A to 5D illustrate an influence caused by difference in perspective in the process for generating the intermediate field angle image.
Figure 5B:
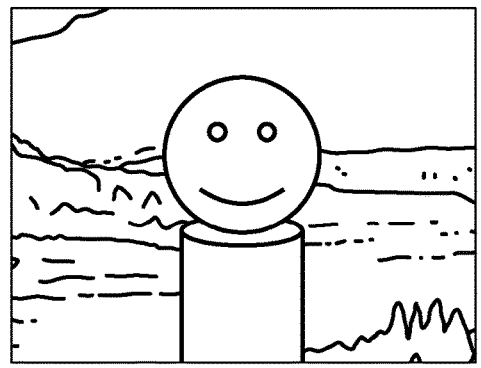

FIG. 5A illustrates a wide angle image IMGw1 and FIG. 5B illustrates a telescopic image IMGt both acquired by imaging from the same position. The two image pickup optical systems used for acquiring the image IMGw and the image IMGt are disposed such that image pickup elements thereof are disposed at the same position in the optical axis direction, whereas the distance from the image pickup element to the entrance pupil plane of the image pickup optical system is not the same. That is, perspectives of the image IMGw and the image IMGt are different from each other.

Figure 5C:
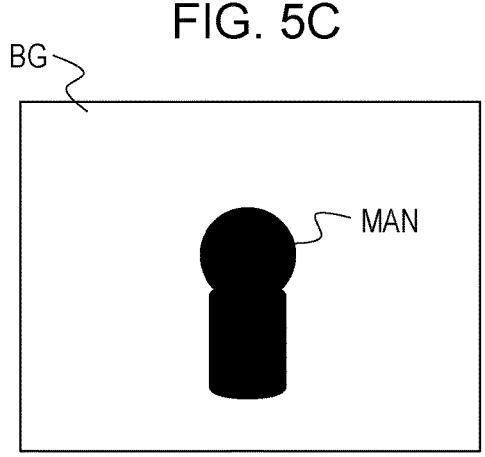

FIG. 5C illustrates depth of an object in the image IMGw. A black area represents depth of the object MAN and a white area represents depth of a background BG. The background BG is located at a rear direction than the object MAN (apart from the image pickup apparatus). That is, the distance from the image pickup apparatus to the background BG is longer than the distance from the image pickup apparatus to the object MAN.

Figure 5D:
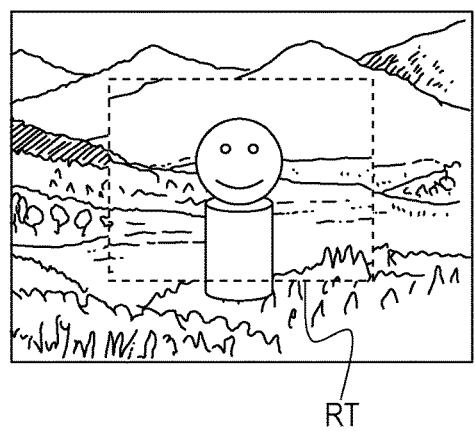

FIG. 5D illustrates the image IMGw of which resolution has been partially increased by using the image IMGt. The image IMGt has been reduced such that the object magnification of the object MAN becomes the same as that of the image IMGw, whereas the object magnifications of the background BG are different because perspectives of the image IMGw and the image IMGt are different from each other. Therefore, the background BG becomes discontinuous on a boundary of an image area RT which corresponds to the field angle of the image IMGt on the image IMGw. If the image IMGt is reduced such that the object magnification of the background BG becomes the same as that of the image IMGw, the object MAN becomes discontinuous on the boundary of the image area RT.

Thus, if perspectives of a plurality of images of different field angles are different, the object magnifications cannot be made the same in the entire image area through reduction or trimming. Therefore, it is difficult to increase resolution of a part of the wide angle image using the telescopic image as described above.

Figure 6:
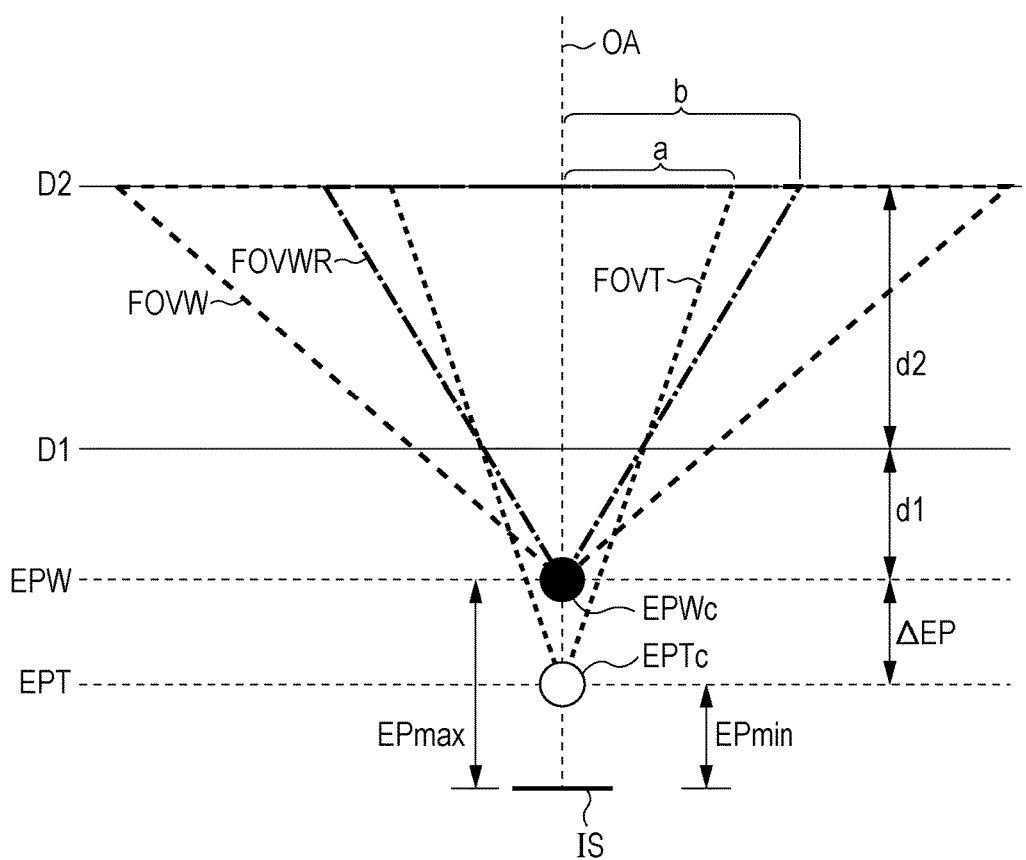
FIG. 6 quantitatively illustrates the influence caused by difference in perspective in the process for generating the intermediate field angle image.

An influence of difference in object magnification caused by difference in the perspectives will be quantitatively described with reference to FIG. 6. A plane EPW illustrates an entrance pupil plane of a wide angle image pickup optical system for acquiring the image IMGw, and a plane EPT illustrates an entrance pupil plane of a telescopic image pickup optical system for acquiring the image IMGt. IS denotes an image pickup element. A point EPWc denotes an intersection of the entrance pupil plane EPW and an optical axis OA, and a point EPTc denotes an intersection of the entrance pupil plane EPT and the optical axis OA. In the following description, the intersection of the entrance pupil plane and the optical axis will be referred to as an entrance pupil plane center.

An area FOVT depicted by the broken line and an area FOVW depicted by the dotted line are viewing angle areas corresponding to the image IMGw and the image IMGt, respectively. An area FOVWR depicted by the dash-dot line is a viewing angle area which corresponds to an image area in which the image IMGw is trimmed such that the object magnification of the object located on a plane D1 becomes the same as that of the image IMGt.

ΔEP denotes a distance between the entrance pupil plane EPT and the entrance pupil plane EPW of each of the telescopic image pickup optical system and the wide angle image pickup optical system. d1 denotes a distance between the entrance pupil plane EPW of the wide angle image pickup optical system and the plane D1. d2 denotes a distance between the plane D1 and a plane D2 located more distanced from the plane D1. a denotes a half field angle of the wide angle image pickup optical system on the plane D2 and b denotes a half field angle of the telescopic image pickup optical system when trimming is performed. A ratio of the object magnification between an image of the telescopic image pickup optical system and an image of the wide angle image pickup optical system when trimming is performed on the plane D2 if the image pickup elements IS corresponding to the telescopic image pickup optical system and the wide angle image pickup optical system are the same in size is expressed in Expression (2).

$$\frac{a}{b} = \frac{d1(d1 + \Delta EP + d2)}{(d1 + d2)(d1 + \Delta EP)} \quad (2)$$

For example, if d1=1000 mm, d2=2000 mm, and ΔEP=10 mm, a difference of 0.66% is caused between the object magnifications of the telescopic image pickup optical system and the wide angle image pickup optical system when trimming is performed. If the number of pixels of the image pickup element is 3000 in the vertical direction and 4000 in the horizontal direction, the image IMGw and the image IMGt will be recorded with the backgrounds being shifted by 8 pixels at a position 50% image height from the center of the image, and the shift amount will appear as a discontinuous component on the boundary.

Since shift in pixels (difference in object magnification) becomes larger as ΔEP becomes larger, ΔEP needs to be small in order to increase resolution of a part of the wide angle image using the telescopic image by the above-described simple process.

Next, a process for obtaining depth information of an object using a plurality of images of different field angles will be described. In the embodiment, since a plurality of image pickup optical systems are disposed at different positions, there is parallax among images generated by imaging using these image pickup optical systems. Depth information of the object can be calculated using the parallax (the object distance can be obtained).

Figure 7:
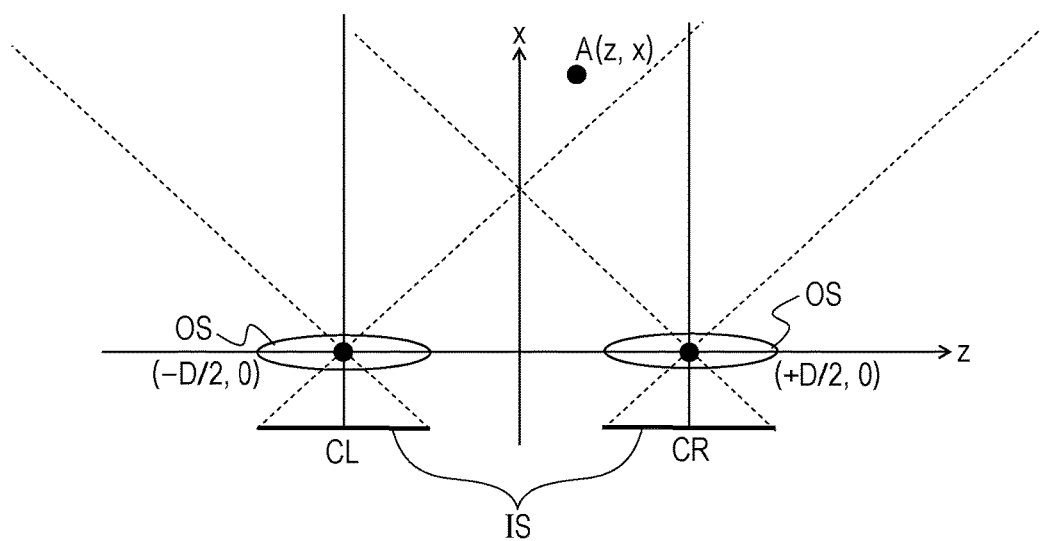
FIG. 7 illustrates a process for obtaining depth information of an object using a plurality of images having parallax.

A calculation method of the object distance when two image pickup systems (an image pickup system CL and an image pickup system CR) are used, for example, will be described with reference to FIG. 7. Each of the image pickup system CL and the image pickup system CR has an image pickup optical system OS and an image pickup element (or an image pickup area) IS. These two image pickup systems CL and CR (the image pickup optical system OS) have the same field angle. An entrance pupil plane center of the image pickup system CL is located at a point (−D/2, 0) and an entrance pupil plane center of the image pickup system CR is located at a point (+D/2, 0). An object A is located at a point (z, x). A focal length of the two image pickup systems CL and CR is defined as f. When the object A is imaged with these two image pickup systems CL and CR, shift zl and shift zr of the object image of the object A from the center of the image pickup element IS in the image pickup system CL and the image pickup system CR, respectively, are provided by Expression (3) and Expression (4).

$$zl = -\frac{\left(\frac{D}{2} + z\right)f}{x} \quad (3)$$

$$zr = \frac{\left(\frac{D}{2} - z\right)f}{x} \quad (4)$$

When these Expressions are used, a distance x to the object A will be calculated by using Expression (5).

$$x = \frac{fD}{zr - zl} \quad (5)$$

D in Expression (5) denotes a baseline length of each of the image pickup systems CL and CR. In the following description, (zr−zl) will be referred to as a parallax or a phase difference. A technique for calculating (measuring) an object distance using two image pickup systems in this manner is referred also to as stereo distance measurement.

Here, if the parallax is defined as d (=zr−zl), resolution of the parallax on the image is defined as Δd, the focal length is defined as f, and the baseline length is defined as D, calculation resolution (distance measurement resolution) Δx of the object distance is provided by Expression (6).

$$\Delta x = \frac{fD}{d} - \frac{fD}{d + \Delta d} = \frac{x}{\frac{fD}{x\Delta d} + 1} \quad (6)$$

Expression (6) shows that the longer the baseline length D, the smaller the distance measurement resolution Δx becomes, which enables highly precise distance measurement. Therefore, in the present embodiment, it is desirable to obtain depth information using (monocular) image pickup optical systems disposed at more separated positions. If a wide angle image is used, it is possible to calculate depth information of a large object area, and if a telescopic image is used, highly precise distance measurement is possible because the image is of high resolution. Therefore, depth information may desirably be calculated using monocular image pickup optical systems suitable for distance measurement condition. The parallax used for obtaining the depth information of the object is the difference in position of the object on a plurality of images acquired using a plurality of image pickup optical systems disposed at different positions. Specifically, a parallax amount is equivalent to k calculated by corresponding point extraction described above.

When obtaining the depth information of the object using a plurality of images of different field angles, trimming or reduction is performed in advance to prepare a plurality of images having the same field angle, i.e., the same object magnification, and then the depth information of the object described above is obtained. However, if the positions of the entrance pupil planes of a plurality of image pickup optical systems used for the acquisition of a plurality of images of different field angles are different, it is difficult to generate images of the same object magnification throughout the entire image due to an influence caused by different perspectives described above (i.e., there is difference in perspective). Therefore, in order to obtain the depth information of the object using a plurality of images of different field angles, difference in perspective among a plurality of images needs to be small, i.e., ΔEP among a plurality of image pickup optical systems needs to be small.

Figure 1:
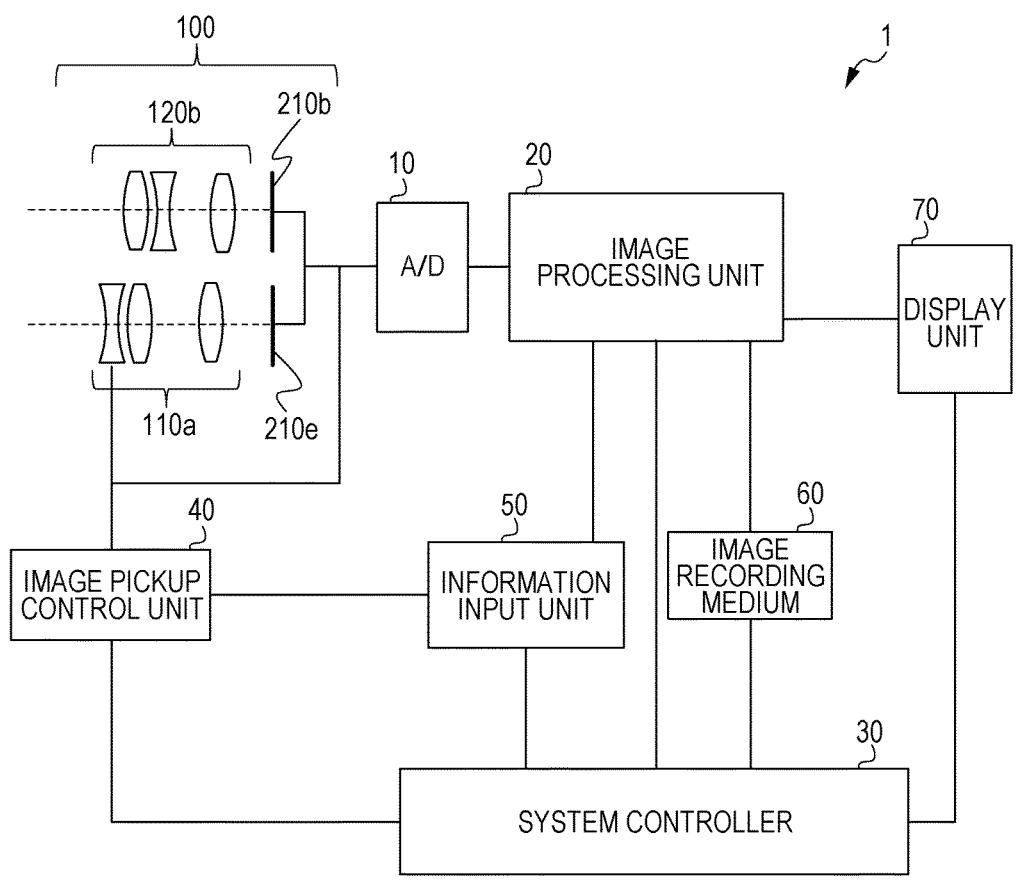
FIG. 1 is a block diagram illustrating a structure of a binocular image pickup apparatus according to each of a first embodiment to a fifth embodiment of the present disclosure.
Figure 8A:
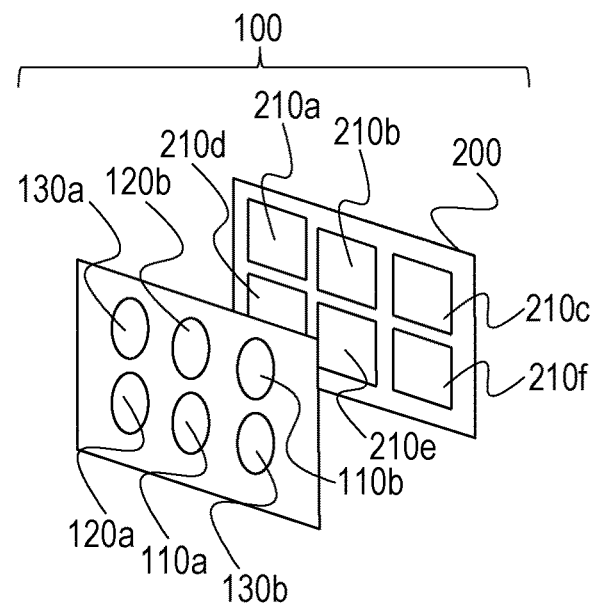
FIG. 8A is a perspective view and FIG. 8B is a front view of the binocular image pickup apparatus illustrated in FIG. 1.
Figure 8B:
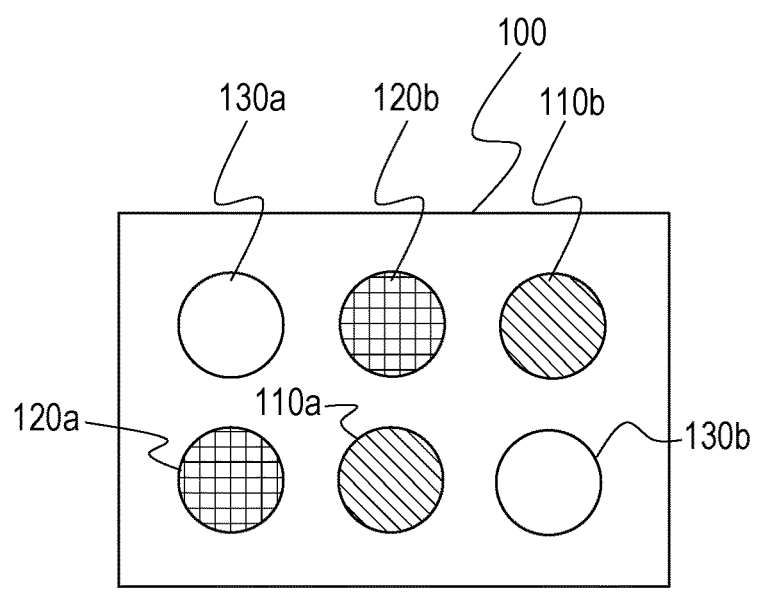

Next, a structure of a binocular image pickup apparatus common to each of the embodiments will be described with reference to FIGS. 1, 8A, and 8B. FIG. 1 illustrates an entire configuration of a binocular image pickup apparatus (hereinafter, referred to as "image pickup apparatus") 1, and FIGS. 8A and 8B illustrate a structure of an image pickup unit 100 provided in the image pickup apparatus 1.

The image pickup apparatus 1 includes an image pickup unit 100, an A/D converter 10, an image processing unit 20, a system controller 30, an image pickup control unit 40, an information input unit 50, an image recording medium 60, and a display unit 70.

The image pickup unit 100 includes six (monocular) image pickup optical systems 110a, 110b, 120a, 120b, 130a, and 130b each of which forms an optical image of an object (an object image). Each image pickup optical system includes a focus lens. The six image pickup optical systems 110a to 130b are disposed such that optical axes thereof are parallel with one another. FIG. 1 illustrates a cross-section including the optical axes of the image pickup optical systems 110a and 120b in the image pickup unit 100.

The two image pickup optical systems provided with the same reference numerals (e.g., 110a and 110b) are a set of image pickup optical systems of the same focal length. In the present embodiment, 3 sets of image pickup optical systems of different focal lengths are provided. The (wide monocular) image pickup optical systems 110a and 110b are a set of wide angle image pickup optical systems of the shortest focal length in the 3 sets. The (middle monocular) image pickup optical systems 120a and 120b are a set of intermediate field angle image pickup optical systems of longer focal length compared with the image pickup optical system 110a and 110b. The (telescopic monocular) image pickup optical systems 130a and 130b are a set of telescopic image pickup optical systems of the longest focal length in the 3 sets.

The image pickup unit 100 includes six image pickup elements 210a, 210b, 220a, 220b, 230a, and 230b each correspond to six image pickup optical systems 110a, 110b, 120a, 120b, 130a, and 130b. The six image pickup elements 210a to 230b are integrally held and constitute an image pickup element unit 200. The six image pickup elements 210a to 230b do not necessarily have to be located on the same plane.

The image pickup optical systems 110a to 130b may be provided integrally with a main body of the image pickup apparatus which includes the image pickup elements 210a to 230b, or may be removable (replaceable) from the main body of the image pickup apparatus.

The image pickup elements 210a to 230b generate electrical signals (analog signals) by performing photoelectric conversion of the object image. The A/D converter 10 illustrated in FIG. 1 converts analog signals output from the image pickup elements 210a to 230b into digital signals, and outputs the digital signals to the image processing unit 20 as image data.

The image processing unit 20 performs image processing, such as predetermined pixel interpolation and color conversion, to the image data from the A/D converter 10. The image data subjected to the processing in the image processing unit 20 is transmitted to the system controller 30. The image processing unit 20 corresponds to the image processing apparatus mounted on the image pickup apparatus 1.

The information input unit 50 acquires information which a user selected desired image pickup conditions and input, and supplies the system controller 30 with the data. The system controller 30 controls the image pickup control unit 40 based on the supplied data. The image pickup control unit 40 performs control about imaging of the position of the focus lens of each image pickup optical system, an aperture value, exposure time of each image pickup element, and so forth.

The system controller 30 controls the image processing unit 20 based on the data from the information input unit 50 to make the image processing unit 20 generate an intermediate field angle image and generate depth information of an object.

The image recording medium 60 stores a still image and a moving image, and stores a file header when constituting an image file. The depth information of an object described above may be stored in the image recording medium 60.

The display unit 70 is constituted by a liquid crystal displaying element etc., and displays a live view image before imaging, an image acquired by imaging, a state of the image pickup apparatus 1, various alerts, and so forth. The display unit 70 also displays an intermediate field angle image generated by the image processing unit 20.

The image pickup element located closest to the image side, i.e., most separated from the object side, in the image pickup unit 100 is defined as a reference image pickup element, and a distance from the reference image pickup element to each entrance pupil plane of each image pickup optical system is defined as EP. The largest value of the distance EP of a plurality of image pickup optical systems is defined as EPmax and the smallest value is defined as EPmin. If a 35 mm equivalent focal length of the telescopic monocular image pickup apparatus is defined as $f_{tele35}$, the condition of Expression (7) will be satisfied.

$$\frac{|EPmax - EPmin|}{f_{tele35}} \leq 0.028 \tag{7}$$

Here, the term "35 mm equivalent focal length" refers to a focal length when the image pickup optical system is proportionally enlarged such that the maximum image height of the image pickup optical system becomes the maximum image height of a 35-mm film, i.e., 21.635 mm.

The condition of Expression (7) defines a relationship between the position of the entrance pupil plane of each of a plurality of image pickup optical systems and the focal length of the telescopic monocular image pickup apparatus. By satisfying this condition, a difference in perspective among a plurality of images of different field angles becomes smaller, and pseudo zooming can be reproduced with a simple process.

More desirably, the condition of Expression (7a) is satisfied. Still more desirably, the condition of Expression (7b) is satisfied.

$$\frac{|EP\max - EP\min|}{f_{tele35}} \leq 0.018 \quad (7a)$$

$$\frac{|EP\max - EP\min|}{f_{tele35}} \leq 0.010 \quad (7b)$$

If the focal length of the telescopic monocular image pickup apparatus is defined as $f_{tele}$, the condition of Expression (8) is satisfied.

$$\frac{|EP\max - EP\min|}{f_{tele}} \leq 0.15 \quad (8)$$

By satisfying the condition of Expression (8), a difference in perspective among a plurality of images of different field angles becomes smaller, and pseudo zooming can be reproduced with a simple process.

More desirably, the condition of Expression (8a) is satisfied. Still more desirably, the condition of Expression (8b) is satisfied.

$$\frac{|EP\max - EP\min|}{f_{tele}} \leq 0.11 \quad (8a)$$

$$\frac{|EP\max - EP\min|}{f_{tele}} \leq 0.06 \quad (8b)$$

EPmax and EPmin satisfy the condition of Expression (9).

$$(1 - EP\min/EP\max) \leq 0.15 \quad (9)$$

By satisfying the condition of Expression (9), a difference in perspective among a plurality of images of different field angles becomes smaller, and pseudo zooming can be reproduced with a simple process. More desirably, the condition of Expression (9a) is satisfied. Still more desirably, the condition of Expression (9b) is satisfied.

$$(1 - EP\min/EP\max) \leq 0.13 \quad (9a)$$

$$(1 - EP\min/EP\max) \leq 0.06 \quad (9b)$$

First Embodiment

Figure 9A:
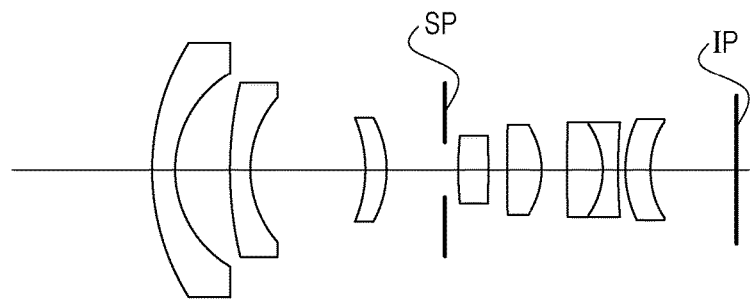
FIGS. 9A to 9C are cross-sectional views of lenses of a wide monocular image pickup apparatus, a middle monocular image pickup apparatus, and a telescopic monocular image pickup apparatus, respectively, of a numerical embodiment 1 corresponding to at least the first embodiment.
Figure 9B:
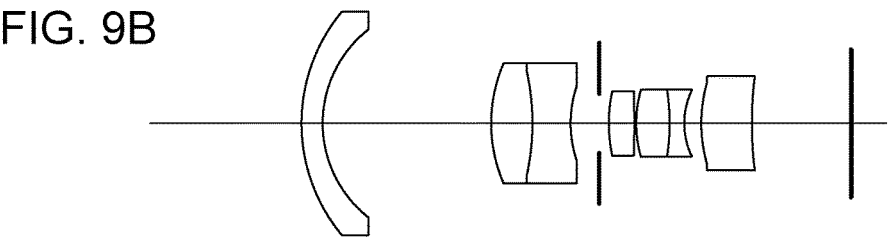
Figure 9C:
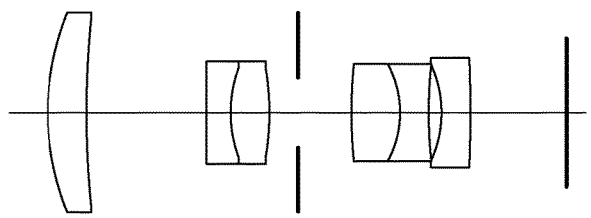

FIGS. 9A, 9B, and 9C illustrate structures of a wide monocular image pickup apparatus, a middle monocular image pickup apparatus, and a telescopic monocular image pickup apparatus, respectively, of an image pickup unit as a first embodiment (a numerical embodiment 1) applicable to the binocular image pickup apparatus 1. The left side of each drawing is the object side (the front side), and the right side is the image side (the rear side). SP denotes an aperture diaphragm and IP denotes an image plane. On the image plane IP, a sensing surface of the image pickup element, such as a CCD sensor and a CMOS sensor, is disposed. Each monocular image pickup apparatus includes a focusing mechanism which moves a focus lens and performs focusing. The focusing mechanism moves the focus lens in an optical axis direction using an actuator, such as a stepping motor. For example, at the time of focusing from an object at infinity to an object at a short-distance, the focus lens is moved toward the object side.

Figure 10A:
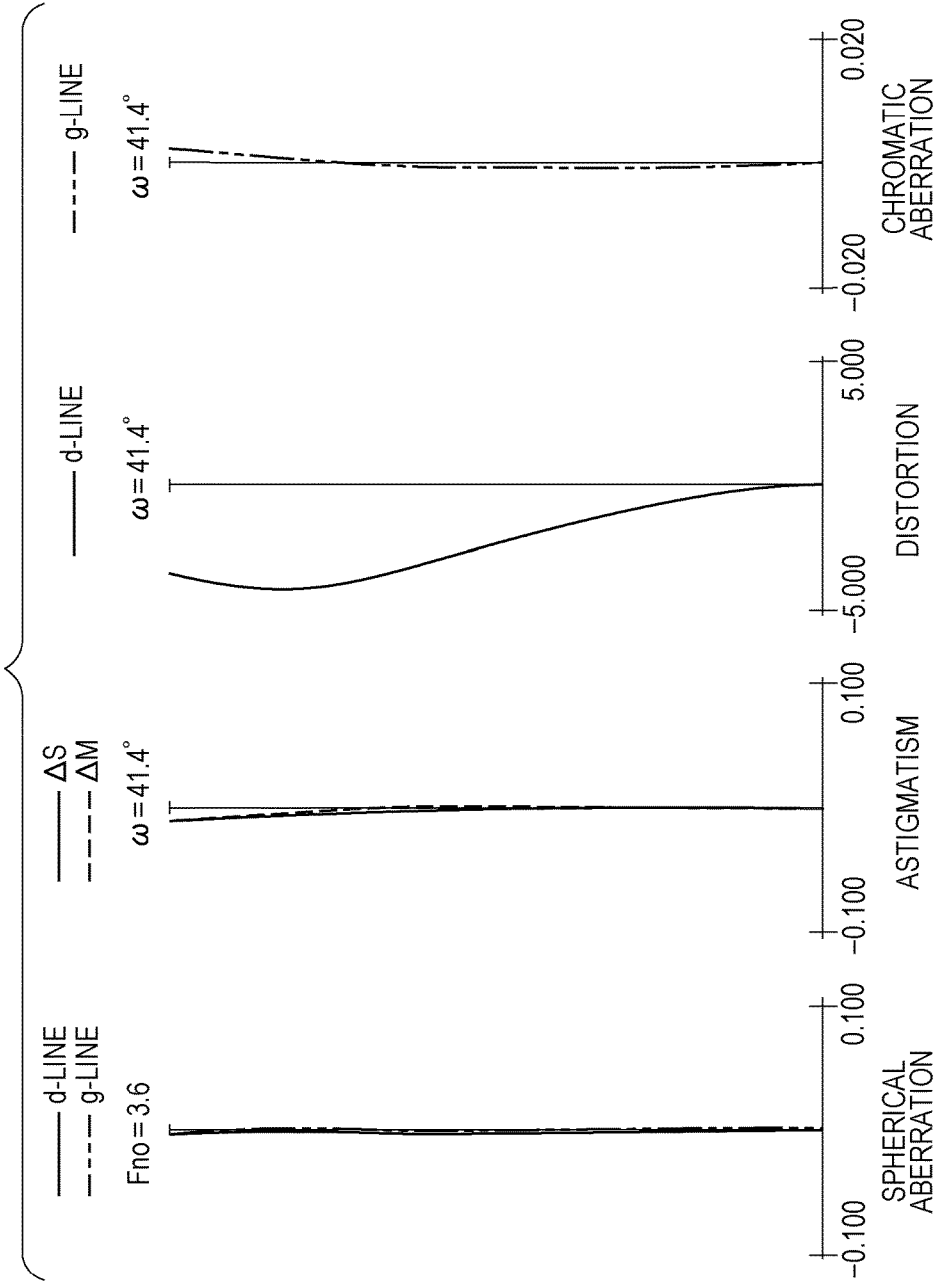

FIGS. 10A, 10B, and 10C are aberration charts of the wide monocular image pickup apparatus, the middle monocular image pickup apparatus, and the telescopic monocular image pickup apparatus, respectively, of the numerical embodiment 1. In the aberration charts, d-line and g-line depict a d-line and a g-line, respectively, and ΔM and ΔS depict a meridional image plane and a sagittal image plane, respectively. Chromatic aberration of magnification is depicted by the F-line. ω denotes a half field angle and Fno denotes an F number. A basic structure and meaning of signs about the image pickup unit described above, and meaning of signs about the aberration charts are the same as those of other embodiments described later.

A distance between an image plane of each monocular image pickup apparatus and an entrance pupil plane is, in a state in which each monocular image pickup apparatus is in-focus at an object at infinity, 23.155467 mm in the wide monocular image pickup apparatus, 18.287505 mm in the middle monocular image pickup apparatus, and 9.161855 mm in the telescopic monocular image pickup apparatus. Each monocular image pickup apparatus is disposed such that a distance between a reference plane and the entrance pupil plane of each monocular image pickup apparatus becomes the same with the image plane of the wide monocular image pickup apparatus serving as the reference plane. That is, the middle monocular image pickup apparatus is disposed such that the image plane thereof is located 4.867962 mm front side of the image plane of the wide monocular image pickup apparatus, and the telescopic monocular image pickup apparatus is disposed such that the image plane thereof is located 13.993612 mm front side of the image plane of the wide monocular image pickup apparatus. Relative positional relationships of the image planes of the wide molecular image pickup apparatus, the middle molecular image pickup apparatus, and the telescopic monocular image pickup apparatus may desirably satisfy these relationships, and they do not necessarily have to be disposed based on the image plane of the wide monocular image pickup apparatus.

In the present embodiment, the telescopic molecular image pickup apparatus, the middle molecular image pickup apparatus, and the wide monocular image pickup apparatus are relatively disposed so that a distance between an entrance pupil plane of the telescopic monocular image pickup apparatus and an entrance pupil plane of the wide monocular image pickup apparatus (hereinafter, referred to as "distance between entrance pupil planes) ΔEP becomes smaller. In this manner, a plurality of images of different field angles can be simultaneously acquired, and a difference in perspective between images can be reduced. This enables zooming after imaging with a simple process.

Second Embodiment

Figure 11A:
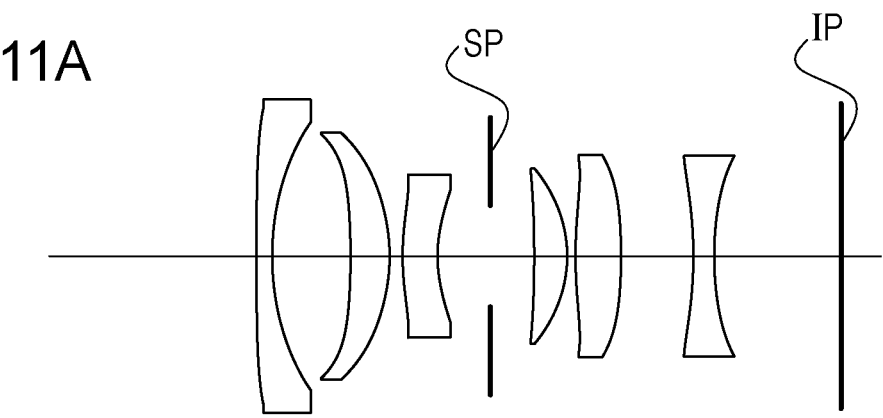
FIGS. 11A and 11B are cross-sectional views of lenses of a wide monocular image pickup apparatus and a telescopic monocular image pickup apparatus, respectively, of a numerical embodiment 2 corresponding to at least a second embodiment.
Figure 11B:
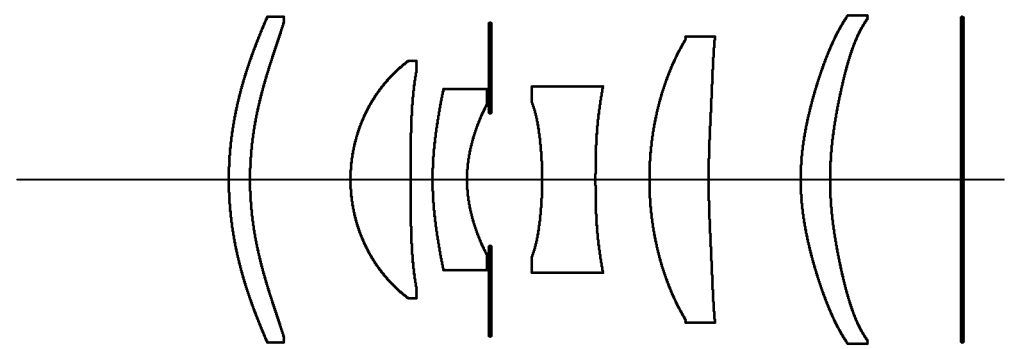

FIGS. 11A and 11B illustrate structures of a wide monocular image pickup apparatus and a telescopic monocular image pickup apparatus, respectively, of an image pickup unit as a second embodiment (a numerical embodiment 2) applicable to the monocular image pickup apparatus 1. FIGS. 12A and 12B are aberration charts of the wide monocular image pickup apparatus and the telescopic monocular image pickup apparatus of the numerical embodiment 2, respectively.

In the present embodiment, unlike the first embodiment, an image plane of the wide monocular image pickup apparatus and an image plane of the telescopic monocular image pickup apparatus are located on the same plane. Therefore, an image pickup element may be provided in each of the wide monocular image pickup apparatus and the telescopic monocular image pickup apparatus, or an image pickup area for the wide monocular image pickup apparatus and for the telescopic monocular image pickup apparatus may be provided in a single image pickup element.

In the present embodiment, by employing an optical structure in which a difference between a distance from an image plane of the telescopic monocular image pickup apparatus and an entrance pupil plane thereof and a distance from an image plane of the wide monocular image pickup apparatus to an entrance pupil plane thereof is small as the telescopic monocular image pickup apparatus and the wide monocular image pickup apparatus, the distance ΔEP between the entrance pupil planes of the telescopic monocular image pickup apparatus and the wide monocular image pickup apparatus is shortened. In this manner, a plurality of images of different field angles can be simultaneously acquired, and a difference in perspective between images can be reduced. This enables zooming after imaging with a simple process.

Third Embodiment

Figure 13A:
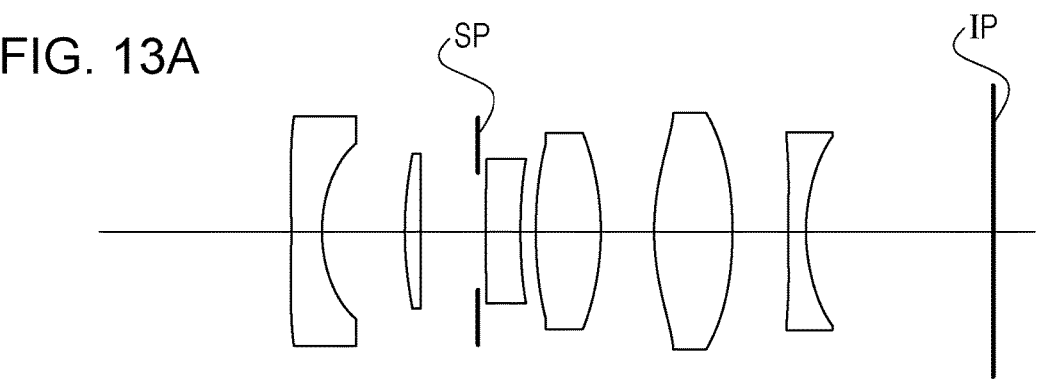
FIGS. 13A and 13B are cross-sectional views of lenses of a wide monocular image pickup apparatus and a telescopic monocular image pickup apparatus, respectively, of a numerical embodiment 3 corresponding to at least a third embodiment.
Figure 13B:
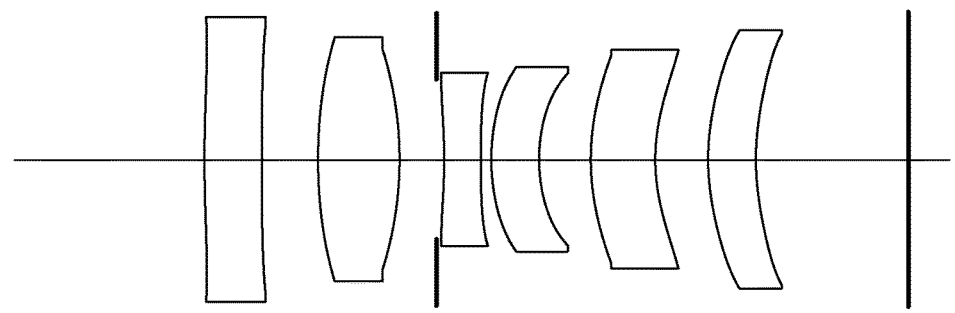

FIGS. 13A and 13B illustrate structures of a wide monocular image pickup apparatus and a telescopic monocular image pickup apparatus, respectively, of an image pickup unit as a third embodiment (a numerical embodiment 3) applicable to the monocular image pickup apparatus 1. FIGS. 14A and 14B are aberration charts of the wide monocular image pickup apparatus and the telescopic monocular image pickup apparatus of the numerical embodiment 3, respectively.

Also in the present embodiment, like the second embodiment, an image plane of the wide monocular image pickup apparatus and an image plane of the telescopic monocular image pickup apparatus are located on the same plane. Therefore, an image pickup element may be provided in each of the wide monocular image pickup apparatus and the telescopic monocular image pickup apparatus, or an image pickup area for the wide monocular image pickup apparatus and for the telescopic monocular image pickup apparatus may be provided in a single image pickup element.

Also in the present embodiment, by employing an optical structure in which a difference between a distance from an image plane of the telescopic monocular image pickup apparatus to an entrance pupil plane thereof and a distance from an image plane of the wide monocular image pickup apparatus to an entrance pupil plane thereof is small as the telescopic monocular image pickup apparatus and the wide monocular image pickup apparatus, the distance ΔEP between the entrance pupil planes of the telescopic monocular image pickup apparatus and the wide monocular image pickup apparatus is shortened. In this manner, a plurality of images of different field angles can be simultaneously acquired, and a difference in perspective between images can be reduced. This enables zooming after imaging with a simple process.

Here, that the simple process can be implemented as described above will be described by providing a specification of the image pickup apparatus. A focal length of the telescopic monocular image pickup apparatus of the third embodiment is 15 mm, and an F number is 2.88. Here, the number of pixels of each image pickup element (e.g., a CMOS sensor of 12M pixels) of the third embodiment is defined as 3000 pixels in the vertical direction and 4000 pixels in the horizontal direction. Since a half diagonal length of the image pickup element is 3.87 mm, the size of each pixel will be 1.54 µm. If an object at the distance of 3000 mm is made to be an in-focus state using the telescopic monocular image pickup apparatus, and a diameter of a permissible circle of confusion is defined as 3.08 µm which is twice the pixel size, a depth of field range becomes about 2700 mm to 3400 mm. That is, if the object at the distance of 3000 mm is imaged in an in-focus state using the telescopic monocular image pickup apparatus of the third embodiment, an in-focus image of the object located in a range of 2700 mm to 3400 mm in the distance can be acquired. That is, it is considered that an object located in this range is a main object acquired with high resolution.

Since the distance ΔEP between the entrance pupil planes of the telescopic monocular image pickup apparatus and the wide monocular image pickup apparatus is 2.2361 mm, a magnification error between the telescopic monocular image pickup apparatus and the wide monocular image pickup apparatus after performing trimming is calculated by substituting ΔEP into Expression (2). If d1=3000 mm and d2=2700 mm, the magnification error will be 0.035%. If d1=3000 mm and d2=3400 mm, the magnification error will be 0.0396%. If converted into a pixel shift amount at a position 100% image height, these magnification errors are equivalent to pixel shift of 0.882 and pixel shift of 0.989, respectively. This indicates that a difference in perspective is not greater than a single pixel, and that perspective correction can be omitted during image composition.

Therefore, if the image pickup element of the specification above is used, an image of an object in the depth of field of the telescopic monocular image pickup apparatus can be composed with an image of the wide monocular image pickup apparatus only by trimming under the optical condition described in the third embodiment.

Here, it is understood that the third embodiment takes values near the upper limit values of the conditions of Expressions (7), (8), and (9) (see Table 1), and if the upper limit values are exceeded, perspective correction will be needed when the image pickup element of the specification above is used.

Also in the present embodiment, like the second embodiment, since the image planes (the image pickup elements) of the monocular image pickup apparatuses are located on the same plane, thickness of the image pickup apparatus 1 can be reduced.

Fourth Embodiment

Figure 15A:
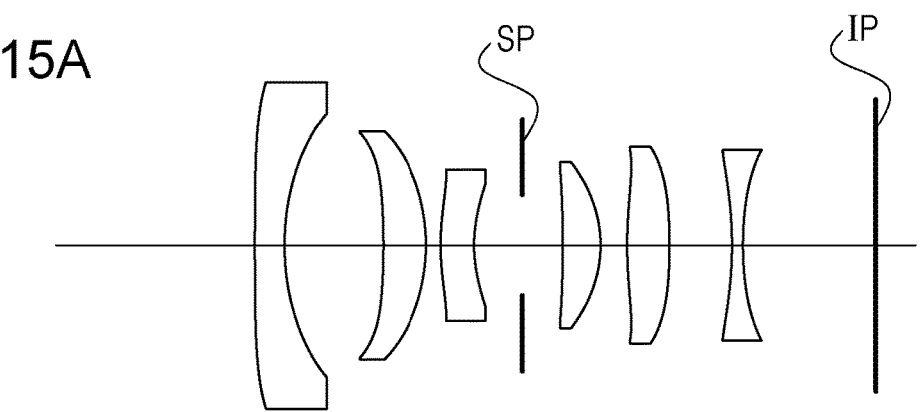
FIGS. 15A and 15B are cross-sectional views of lenses of a wide monocular image pickup apparatus and a telescopic monocular image pickup apparatus, respectively, of a numerical embodiment 4 corresponding to at least a fourth embodiment.
Figure 15B:
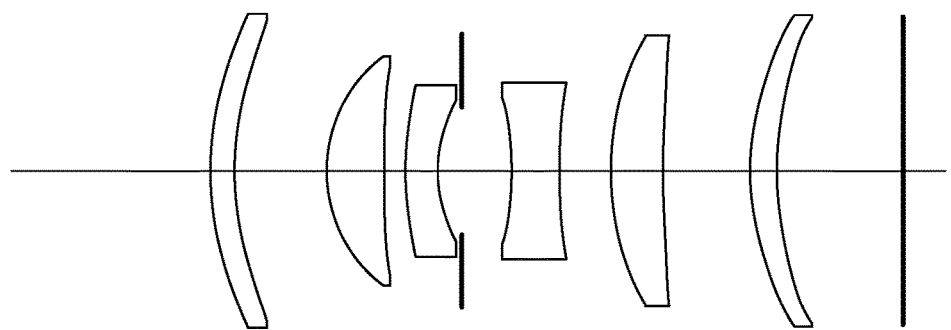

FIGS. 15A and 15B illustrate structures of a wide monocular image pickup apparatus and a telescopic monocular image pickup apparatus, respectively, of an image pickup unit as a fourth embodiment (a numerical embodiment 4) applicable to the monocular image pickup apparatus 1. FIGS. 16A and 16B are aberration charts of the wide monocular image pickup apparatus and the telescopic monocular image pickup apparatus of the numerical embodiment 4, respectively.

Also in the present embodiment, like the second embodiment, an image plane of the wide monocular image pickup apparatus and an image plane of the telescopic monocular image pickup apparatus are located on the same plane. Therefore, an image pickup element may be provided in each of the wide monocular image pickup apparatus and the telescopic monocular image pickup apparatus, or an image pickup area for the wide monocular image pickup apparatus and for the telescopic monocular image pickup apparatus may be provided in a single image pickup element.

Also in the present embodiment, by employing an optical structure in which a difference between a distance from an image plane of the telescopic monocular image pickup apparatus to an entrance pupil plane thereof and a distance from an image plane of the wide monocular image pickup apparatus to an entrance pupil plane thereof is small as the telescopic monocular image pickup apparatus and the wide monocular image pickup apparatus, the distance ΔEP between the entrance pupil planes of the telescopic monocular image pickup apparatus and the wide monocular image pickup apparatus is shortened. In this manner, a plurality of images of different field angles can be simultaneously acquired, and a difference in perspective between images can be reduced. This enables zooming after imaging with a simple process. Since the image planes (the image pickup elements) of the monocular image pickup apparatuses are located on the same plane, thickness of the image pickup apparatus 1 can be reduced.

Fifth Embodiment

Figure 17A:
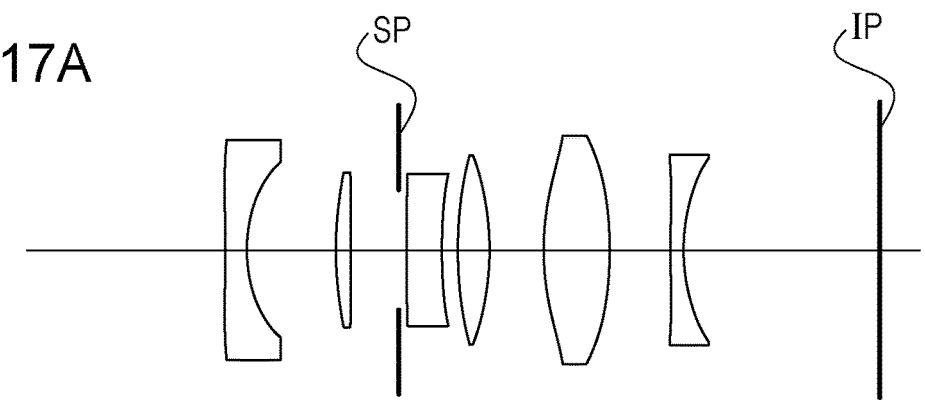
FIGS. 17A and 17B are cross-sectional views of lenses of a wide monocular image pickup apparatus and a telescopic monocular image pickup apparatus, respectively, of a numerical embodiment 5 corresponding to at least a fifth embodiment.
Figure 17B:
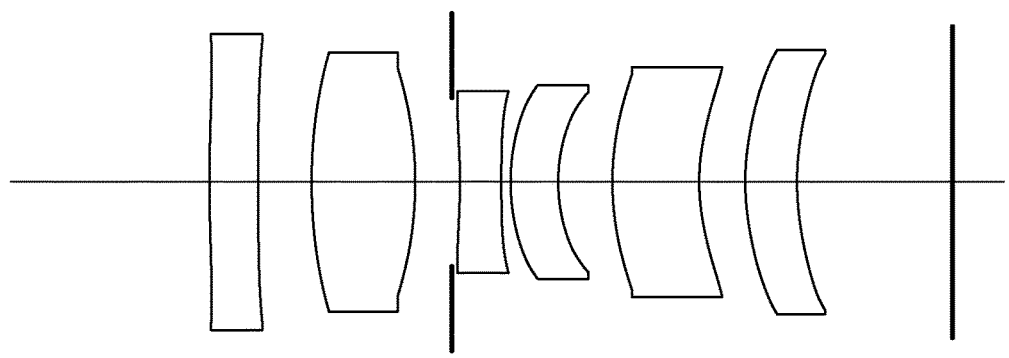

FIGS. 17A and 17B illustrate structures of a wide monocular image pickup apparatus and a telescopic monocular image pickup apparatus, respectively, of an image pickup unit as a fifth embodiment (a numerical embodiment 5) applicable to the monocular image pickup apparatus 1. FIGS. 18A and 18B are aberration charts of the wide monocular image pickup apparatus and the telescopic monocular image pickup apparatus of the numerical embodiment 5, respectively.

Also in the present embodiment, like the second embodiment, an image plane of the wide monocular image pickup apparatus and an image plane of the telescopic monocular image pickup apparatus are located on the same plane. Therefore, an image pickup element may be provided in each of the wide monocular image pickup apparatus and the telescopic monocular image pickup apparatus, or an image pickup area for the wide monocular image pickup apparatus and for the telescopic monocular image pickup apparatus may be provided in a single image pickup element.

Also in the present embodiment, by employing an optical structure in which a difference between a distance from an image plane of the telescopic monocular image pickup apparatus to an entrance pupil plane thereof and a distance from an image plane of the wide monocular image pickup apparatus to an entrance pupil plane thereof is small as the telescopic monocular image pickup apparatus and the wide monocular image pickup apparatus, the distance ΔEP between the entrance pupil planes of the telescopic monocular image pickup apparatus and the wide monocular image pickup apparatus is shortened. In this manner, a plurality of images of different field angles can be simultaneously acquired, and a difference in perspective between images can be reduced. This enables zooming after imaging with a simple process. Since the image planes (the image pickup elements) of the monocular image pickup apparatuses are located on the same plane, thickness of the image pickup apparatus 1 can be reduced.

In the first to the fifth embodiments, a case in which a plurality of monocular image pickup apparatuses of different focal lengths are relatively disposed such that the distance ΔEP between the entrance pupil planes of these monocular image pickup apparatuses becomes smaller, and a case in which an optical structure in which a difference in distance from each image plane to an entrance pupil plane of a plurality of monocular image pickup apparatuses is small is employed has been described. A feature common to each embodiment is that the distance ΔEP between the entrance pupil planes of a plurality of monocular image pickup apparatuses is short, and the distance ΔEP between the entrance pupil planes of a plurality of monocular image pickup apparatuses may be shortened by techniques other than adjustment of relative positions of a plurality of monocular image pickup apparatuses or adjustment of each optical structure of a plurality of monocular image pickup apparatuses.

Hereinafter, numerical data of the numerical embodiments 1 to 5 described above will be provided. In each numerical embodiment, i denotes the number of the planes counted from the object side. ri denotes a curvature radius of an i-th optical surface (an i-th surface), di denotes an on-axis interval between the i-th surface and a (i+1) surface. Ndi denotes a refractive index of a material of the i-th optical member against a d-line, and νdi denotes the Abbe number of that material. If a distance d is 0, it is indicated that front-rear adjacent surfaces are joined together.

An aspheric surface shape is provided by the following Expression if R denotes a curvature radius and K, A3, A4, A5, A6, A7, A8, A9, A10, A11, and A12 denote aspheric surface coefficients.

$$X=(H^2/R)/[1+\{1-(1+K)(H/R)2\}^{1/2}]+A3 \cdot H^3+A4 \cdot H^4+A5 \cdot H^5+A6 \cdot H^6+A7 \cdot H^7+A8 \cdot H^8+A9 \cdot H^9+A10 \cdot H^{10}+A11 \cdot H^{11}+A12 \cdot H^{12}$$

"e±XX" in each aspheric surface coefficient means "x 10±XX."

The focal length, the F number, the field angle, the entrance pupil plane position, and the relative entrance pupil plane position each represent values when an object at infinity is in-focus. BF denotes an air-converted value of the distance from the final lens surface to the image plane. The entrance pupil plane position is a distance between the image plane and the entrance pupil plane in each monocular image pickup apparatus, and the relative entrance pupil plane position is a distance between the image plane of the wide monocular image pickup apparatus and the entrance pupil plane of other monocular image pickup apparatus.

Relationships between each of the numerical embodiments and Expressions (7) to (9) are shown in Table 1. As calculation conditions of Expressions (7) to (9), the maximum value and the minimum value of the distance between the reference image plane described above and the entrance pupil plane of each monocular image pickup apparatus are substituted into the EPmax and EPmin. The focal length of the telescopic monocular image pickup apparatus is substituted into $f_{tele}$, and the 35 mm equivalent focal length of the telescopic monocular image pickup apparatus is substituted into $f_{tele35}$.

Numerical Embodiment 1

Wide monocular
Unit mm
Surface data

| Surface No. | r | d | nd | vd | Effective dia. |
|---|---|---|---|---|---|
| 1 | 12.599 | 1.20 | 1.69680 | 55.5 | 12.35 |
| 2 | 5.910 | 2.88 | | | 9.42 |
| 3 | 19.467 | 1.10 | 1.49700 | 81.5 | 8.46 |
| 4 | 5.765 | 6.02 | | | 7.03 |
| 5 | −7.026 | 1.11 | 1.48749 | 70.2 | 5.04 |
| 6 | −5.674 | | | | 5.01 |
| 7 (diaphragm) | ∞ | 0.70 | | | 2.89 |
| 8* | 13.248 | 1.58 | 1.55332 | 71.7 | 2.97 |
| 9 | −129.295 | 0.98 | | | 3.27 |
| 10 | 92.108 | 1.84 | 1.49700 | 81.5 | 3.90 |
| 11 | −4.284 | 1.34 | | | 4.37 |
| 12 | 144.744 | 1.87 | 1.48749 | 70.2 | 4.39 |
| 13 | −4.145 | 0.80 | 1.69895 | 30.1 | 4.38 |
| 14 | 31.503 | 0.38 | | | 4.61 |
| 15 | 6.152 | 1.29 | 1.80610 | 40.7 | 4.90 |
| 16* | 5.350 | | | | 4.63 |
| Image plane | ∞ | | | | |

Aspheric surface data

8th surface $K = -2.21433e+001$  $A\,4 = -1.36293e-003$  $A\,6 = -2.39800e-004$  $A\,8 = -5.99206e-006$ 16th surface $K = 6.34483e-002$  $A\,4 = 2.20028e-003$  $A\,6 = 8.54877e-005$ Various types of data

| | |
|---|---|
| Focal length | 4.40 |
| F number | 3.60 |
| Feld angle | 41.37 |
| Image height | 3.88 |
| Total lens length | 30.63 |
| BF | 4.51 |
| Entrance pupil plane position | 23.155467 |
| Relative entrance pupil plane position | 23.155467 |

Single lens data

| Lens | Starting surface | Focal length |
|---|---|---|
| 1 | 1 | −17.25 |
| 2 | 3 | −16.93 |
| 3 | 5 | 47.60 |
| 4 | 8 | 21.80 |
| 5 | 10 | 8.29 |
| 6 | 12 | 8.30 |
| 7 | 13 | −5.19 |
| 8 | 15 | −179.55 |

Middle monocular
Unit mm
Surface data

| Surface No. | r | d | nd | vd | Effective dia. |
|---|---|---|---|---|---|
| 1 | 9.170 | 1.11 | 2.00100 | 29.1 | 10.70 |
| 2 | 6.253 | 8.85 | | | 9.11 |
| 3 | 7.926 | 2.16 | 1.80518 | 25.4 | 5.82 |
| 4 | −12.559 | 2.00 | 1.84666 | 23.8 | 5.03 |
| 5 | 6.151 | | | | 3.66 |
| 6 (diaphragm) | ∞ | | | | 3.09 |
| 7 | 8.139 | 1.33 | 2.00100 | 29.1 | 3.11 |
| 8 | −52.364 | 0.10 | | | 3.13 |
| 9 | 6.449 | 1.75 | 1.72916 | 54.7 | 3.25 |
| 10 | −11.724 | 0.77 | 1.85478 | 24.8 | 3.22 |

-continued

| | | | | | |
|---|---|---|---|---|---|
| 11 | 3.981 | 0.89 | | | 3.23 |
| 12 | 7.838 | 2.68 | 1.76802 | 49.2 | 3.98 |
| 13* | 23.288 | | | | 4.56 |
| Image plane | ∞ | | | | |

Aspheric surface data

13th surface

K = 0.00000e+000    A 4 = 9.48580e−004    A 6 = −7.54389e−005    A 8 = 5.78037e−006
A10 = −2.24378e−007

Various types of data

| | |
|---|---|
| Focal length | 9.00 |
| F number | 3.60 |
| Field angle | 23.29 |
| Image height | 3.88 |
| Total lens length | 28.83 |
| BF | 5.18 |
| Entrance pupil plane position | 18.287505 |
| Relative entrance pupil plane position | 23.155467 |

Single lens data

| Lens | Starting surface | Focal length |
|---|---|---|
| 1 | 1 | −24.25 |
| 2 | 3 | 6.33 |
| 3 | 4 | −4.65 |
| 4 | 7 | 7.12 |
| 5 | 9 | 5.95 |
| 6 | 10 | −3.40 |
| 7 | 12 | 14.30 |

Telescopic monocular
Unit mm
Surface data

| Surface No. | r | d | nd | vd | Effective dia. |
|---|---|---|---|---|---|
| 1* | 13.031 | 2.05 | 1.55332 | 71.7 | 9.71 |
| 2 | 49.486 | 6.28 | | | 9.04 |
| 3 | −974.786 | 1.26 | 1.60342 | 38.0 | 4.96 |
| 4 | 6.738 | 2.03 | 1.51633 | 64.1 | 4.31 |
| 5 | −13.932 | | | | 4.12 |
| 6 (diaphragm) | ∞ | 2.83 | | | 3.68 |
| 7 | 26.728 | 2.54 | 2.00069 | 25.5 | 4.60 |
| 8 | −5.327 | 1.50 | 1.80809 | 22.8 | 4.73 |
| 9 | 24.119 | 0.67 | | | 4.66 |
| 10 | −6.046 | 1.51 | 1.48749 | 70.2 | 4.67 |
| 11 | −70.836 | | | | 5.32 |
| Image plane | ∞ | | | | |

Aspheric surface data

1st surface

K = 0.00000e+000    A 4 = −7.04359e−005    A 6 = −5.74508e−007    A 8 = −8.79561e−010

Various types of data

| | |
|---|---|
| Focal length | 21.00 |
| F number | 3.60 |
| Field angle | 10.45 |
| Image height | 3.88 |
| Total lens length | 27.21 |
| BF | 5.03 |
| Entrance pupil plane position | 9.161855 |
| Relative entrance pupil plane position | 23.155467 |

Single lens data

| Lens | Starting surface | Focal length |
|---|---|---|
| 1 | 1 | 31.34 |
| 2 | 3 | −11.08 |
| 3 | 4 | 9.10 |
| 4 | 7 | 4.62 |

-continued

| | | |
|---|---|---|
| 5 | 8 | −5.28 |
| 6 | 10 | −13.66 |

Numerical Embodiment 2

Wide monocular
Unit mm
Surface data

| Surface No. | r | d | nd | vd | Effective dia. |
|---|---|---|---|---|---|
| 1* | 201.674 | 0.38 | 1.69680 | 55.5 | 6.97 |
| 2* | 6.561 | 1.88 | | | 5.97 |
| 3* | −18.014 | 0.94 | 1.59240 | 68.3 | 5.44 |
| 4* | −4.276 | 0.31 | | | 5.51 |
| 5* | 6.208 | 0.84 | 1.80518 | 25.4 | 3.63 |
| 6* | 3.385 | 1.27 | | | 2.92 |
| 7 (diaphragm) | ∞ | 1.05 | | | 2.44 |
| 8* | −30.088 | 0.79 | 1.64000 | 60.1 | 3.74 |
| 9* | −3.082 | 0.20 | | | 3.90 |
| 10* | 10.911 | 1.09 | 1.59240 | 68.3 | 4.31 |
| 11* | −13.592 | 1.74 | | | 4.51 |
| 12* | −10.128 | 0.50 | 1.84666 | 23.8 | 4.39 |
| 13* | 7.782 | | | | 4.47 |
| Image plane | ∞ | | | | |

Aspheric surface data

1st surface

K = 3.18533e+003    A 4 = 5.43061e−004    A 6 = 1.11859e−005

2nd surface

K = 1.77382e+000    A 4 = −3.42682e−005    A 6 = −6.65898e−005

3rd surface

K = 7.90003e+000    A 4 = −1.31130e−003    A 6 = −5.49278e−004

4th surface

K = −8.28738e+000    A 4 = −5.28202e−003    A 6 = −1.42577e−004

5th surface

K = −1.49274e+000    A 4 = −8.25946e−003    A 6 = −9.50477e−004

6th surface

K = −5.17503e+000    A 4 = −2.93008e−004    A 6 = −5.80465e−005

8th surface

K = −4.26537e+001    A 4 = −1.31809e−003    A 6 = 7.24701e−005

9th surface

K = −1.03131e+000    A 4 = −2.26502e−003    A 6 = −2.47866e−004

10th surface

K = −3.26403e+001    A 4 = −2.99975e−004    A 6 = −6.77727e−004

11th surface

K = 5.94643e+000    A 4 = −5.39096e−003    A 6 = −1.59762e−004

12th surface

K = −2.52189e+001    A 4 = −3.15116e−003    A 6 = 5.30793e−004

13th surface

K = −1.26747e+001    A 4 = 4.33944e−003    A 6 = 1.74776e−004

Various types of data

| | |
|---|---|
| Focal length | 5.20 |
| F number | 2.84 |
| Field angle | 36.59 |
| Image height | 3.86 |

-continued

| | |
|---|---|
| Total lens length | 14.05 |
| BF | 3.05 |
| Entrance pupil plane position | 10.500027 |
| Relative entrance pupil plane position | 10.500027 |

Single lens data

| Lens | Starting surface | Focal length |
|---|---|---|
| 1 | 1 | −9.74 |
| 2 | 3 | 9.23 |
| 3 | 5 | −10.66 |
| 4 | 8 | 5.30 |
| 5 | 10 | 10.39 |
| 6 | 12 | −5.13 |

Telescopic monocular
Unit mm
Surface data

| Surface No. | r | d | nd | vd | Effective dia. |
|---|---|---|---|---|---|
| 1* | 7.944 | 0.51 | 1.49700 | 81.5 | 7.25 |
| 2* | 7.529 | 2.41 | | | 6.98 |
| 3* | 3.726 | 1.44 | 1.61800 | 63.3 | 5.29 |
| 4* | 101.561 | 0.53 | | | 4.83 |
| 5* | 7.186 | 0.83 | 1.80518 | 25.4 | 4.04 |
| 6* | 3.248 | 0.55 | | | 3.33 |
| 7 (diaphragm) | ∞ | 1.25 | | | 3.25 |
| 8* | −8.552 | 1.28 | 1.64000 | 60.1 | 3.41 |
| 9* | 27.157 | 1.29 | | | 4.16 |
| 10* | 7.356 | 1.42 | 1.59240 | 68.3 | 6.25 |
| 11* | 19.062 | 2.21 | | | 6.36 |
| 12* | 5.904 | 0.71 | 1.84666 | 23.8 | 7.31 |
| 13* | 7.630 | | | | 7.15 |
| Image plane | ∞ | | | | |

Aspheric surface data

1st surface

K = 6.23259e−001    A 4 = −3.90597e−004    A 6 = −1.87272e−005

2nd surface

K = 7.77525e−001    A 4 = −6.85926e−004    A 6 = −4.70070e−005

3rd surface

K = 1.60161e−001    A 4 = 5.60777e−005    A 6 = −1.66027e−005

4th surface

K = 1.11453e+003    A 4 = 2.32860e−003    A 6 = −3.60349e−005

5th surface

K = −8.87330e+000    A 4 = −2.17576e−003    A 6 = 2.61698e−004

6th surface

K = 1.74147e−001    A 4 = −9.22386e−003    A 6 = 4.65217e−004

8th surface

K = 1.43693e+001    A 4 = 4.51859e−003    A 6 = −9.41617e−004

9th surface

K = 1.14385e+002    A 4 = 6.11052e−003    A 6 = −7.95376e−004

10th surface

K = 9.59440e−001    A 4 = −2.05043e−004    A 6 = 1.57404e−005

11th surface

K = −7.51781e+001    A 4 = −1.58918e−003    A 6 = 9.61757e−005

-continued

| 12th surface | | |
|---|---|---|
| K = −2.06557e+000 | A 4 = −1.81036e−003 | A 6 = 1.00403e−004 |
| 13th surface | | |
| K = 1.81269e+000 | A 4 = −3.17830e−003 | A 6 = 9.78732e−005 |

Various types of data

| | |
|---|---|
| Focal length | 15.00 |
| F number | 2.88 |
| Field angle | 14.43 |
| Image height | 3.86 |
| Total lens length | 17.63 |
| BF | 3.18 |
| Entrance pupil plane position | 10.500015 |
| Relative entrance pupil plane position | 10.500015 |

Single lens data

| Lens | Starting surface | Focal length |
|---|---|---|
| 1 | 1 | −489.22 |
| 2 | 3 | 6.22 |
| 3 | 5 | −8.12 |
| 4 | 8 | −10.02 |
| 5 | 10 | 19.35 |
| 6 | 12 | 25.95 |

Numerical Embodiment 3

Wide monocular
Unit mm
Surface data

| Surface No. | r | d | nd | vd | Effective dia. |
|---|---|---|---|---|---|
| 1* | −50.720 | 0.78 | 1.72916 | 54.7 | 5.43 |
| 2* | 3.903 | 2.11 | | | 4.16 |
| 3* | 9.464 | 0.41 | 1.59240 | 68.3 | 3.67 |
| 4* | −310.383 | 1.45 | | | 3.59 |
| 5 (diaphragm) | ∞ | | | | 3.00 |
| 6* | 117.090 | 0.90 | 1.80518 | 25.4 | 3.05 |
| 7* | 15.022 | 0.39 | | | 3.41 |
| 8* | 11.592 | 1.65 | 1.64000 | 60.1 | 4.11 |
| 9* | −7.162 | | | | 4.64 |
| 10* | 6.489 | 1.99 | 1.59240 | 68.3 | 5.49 |
| 11* | −9.646 | 1.43 | | | 5.59 |
| 12* | 27.396 | 0.45 | 1.84666 | 23.8 | 4.68 |
| 13* | 4.732 | | | | 4.47 |
| Image plane | ∞ | | | | |

Aspheric surface data

| 1st surface | | |
|---|---|---|
| K = −1.39784e+003 | A 4 = 1.42852e−003 | A 6 = 1.93392e−005 |
| 2nd surface | | |
| K = 1.30013e+000 | A 4 = 1.66030e−004 | A 6 = −1.84189e−005 |
| 3rd surface | | |
| K = 1.35548e+001 | A 4 = −2.62249e−003 | A 6 = −3.35919e−004 |
| 4th surface | | |
| K = 1.67898e+004 | A 4 = 1.89254e−004 | A 6 = −1.23993e−004 |
| 6th surface | | |
| K = −1.45513e+003 | A 4 = 6.98572e−004 | A 6 = 1.86520e−004 |
| 7th surface | | |
| K = −5.28938e+001 | A 4 = 3.20245e−003 | A 6 = 2.63310e−004 |
| 8th surface | | |
| K = −2.82151e+001 | A 4 = 3.26462e−003 | A 6 = −3.99576e−005 |

-continued

| 9th surface | | |
|---|---|---|
| K = −1.78525e+000 | A 4 = −5.68605e−004 | A 6 = −3.37859e−005 |
| 10th surface | | |
| K = −8.72749e+000 | A 4 = 2.15334e−003 | A 6 = −2.93238e−004 |
| 11th surface | | |
| K = 1.67089e+000 | A 4 = −2.08245e−003 | A 6 = 1.24336e−005 |
| 12th surface | | |
| K = 9.80268e+000 | A 4 = −8.65052e−003 | A 6 = 7.25230e−004 |
| 13th surface | | |
| K = −3.97681e+000 | A 4 = 7.59091e−004 | A 6 = 6.08960e−004 |

Various types of data

| | |
|---|---|
| Focal length | 5.20 |
| F number | 2.88 |
| Field angle | 36.62 |
| Image height | 3.87 |
| Total lens length | 17.86 |
| BF | 4.75 |
| Entrance pupil plane position | 15.220198 |
| Relative entrance pupil plane position | 15.220198 |

Single lens data

| Lens | Starting surface | Focal length |
|---|---|---|
| 1 | 1 | −4.94 |
| 2 | 3 | 15.51 |
| 3 | 6 | −21.49 |
| 4 | 8 | 7.16 |
| 5 | 10 | 6.86 |
| 6 | 12 | −6.82 |

Telescopic monocular
Unit mm
Surface data

| Surface No. | r | d | nd | vd | Effective dia. |
|---|---|---|---|---|---|
| 1* | 35.823 | 1.50 | 1.72916 | 54.7 | 6.94 |
| 2* | 135.803 | 1.47 | | | 6.54 |
| 3* | 13.436 | 2.13 | 1.59240 | 68.3 | 5.94 |
| 4* | −9.633 | 0.98 | | | 5.37 |
| 5 (diaphragm) | ∞ | | | | 4.21 |
| 6* | −13.810 | 0.96 | 1.80518 | 25.4 | 4.20 |
| 7* | 60.932 | 0.27 | | | 4.22 |
| 8* | 5.538 | 1.25 | 1.64000 | 60.1 | 4.50 |
| 9* | 4.509 | | | | 4.19 |
| 10* | 6.481 | 1.69 | 1.59240 | 68.3 | 5.06 |
| 11* | 5.061 | 1.40 | | | 5.32 |
| 12* | 6.275 | 1.25 | 1.84666 | 23.8 | 6.28 |
| 13* | 6.846 | | | | 6.11 |
| Image plane | ∞ | | | | |

Aspheric surface data

| 1st surface | | |
|---|---|---|
| K = −8.49665e+001 | A 4 = −5.70428e−004 | A 6 = −3.93001e−006 |
| 2nd surface | | |
| K = 4.54931e+002 | A 4 = 1.27133e−004 | A 6 = 1.48073e−005 |
| 3rd surface | | |
| K = −1.11701e+001 | A 4 = 1.14812e−003 | A 6 = −2.25312e−005 |
| 4th surface | | |
| K = 8.42303e−001 | A 4 = 9.35453e−005 | A 6 = 4.50797e−006 |
| 6th surface | | |
| K = −7.42277e+001 | A 4 = 2.34627e−003 | A 6 = 7.75718e−006 |
| 7th surface | | |
| K = −9.00000e+001 | A 4 = 4.80467e−003 | A 6 = 7.24665e−005 |

-continued

8th surface

| | | |
|---|---|---|
| K = −1.03767e+001 | A 4 = 6.56606e−003 | A 6 = 1.46568e−004 |

9th surface

| | | |
|---|---|---|
| K = 1.08825e+000 | A 4 = 2.13004e−004 | A 6 = 5.49288e−004 |

10th surface

| | | |
|---|---|---|
| K = −7.95360e−001 | A 4 = −9.10018e−004 | A 6 = 1.30988e−005 |

11th surface

| | | |
|---|---|---|
| K = −5.42137e+000 | A 4 = 1.10470e−003 | A 6 = −1.87525e−004 |

12th surface

| | | |
|---|---|---|
| K = −8.69932e−003 | A 4 = −3.37554e−003 | A 6 = 1.80329e−004 |

13th surface

| | | |
|---|---|---|
| K = 1.99191e+000 | A 4 = −4.55184e−003 | A 6 = 1.49814e−004 |

Various types of data

| | |
|---|---|
| Focal length | 15.00 |
| F number | 2.88 |
| Field angle | 14.45 |
| Image height | 3.87 |
| Total lens length | 18.45 |
| BF | 3.98 |
| Entrance pupil plane position | 12.984092 |
| Relative entrance pupil plane position | 12.984092 |

Single lens data

| Lens | Starting surface | Focal length |
|---|---|---|
| 1 | 1 | 66.31 |
| 2 | 3 | 9.81 |
| 3 | 6 | −13.90 |
| 4 | 8 | −72.12 |
| 5 | 10 | −69.90 |
| 6 | 12 | 44.32 |

Numerical Embodiment 4

Wide monocular
Unit mm
Surface data

| Surface No. | r | d | nd | νd | Effective dia. |
|---|---|---|---|---|---|
| 1* | 212.566 | 0.75 | 1.69680 | 55.5 | 7.63 |
| 2* | 6.440 | 2.49 | | | 6.17 |
| 3* | −18.572 | 1.08 | 1.59240 | 68.3 | 5.25 |
| 4* | −4.354 | 0.37 | | | 5.31 |
| 5* | 6.379 | 0.84 | 1.80518 | 25.4 | 3.52 |
| 6* | 3.463 | 1.22 | | | 2.90 |
| 7 (diaphragm) | ∞ | 1.02 | | | 2.53 |
| 8* | −32.652 | 0.95 | 1.64000 | 60.1 | 3.59 |
| 9* | −3.158 | 0.67 | | | 3.87 |
| 10* | 10.908 | 1.06 | 1.59240 | 68.3 | 4.41 |
| 11* | −14.162 | 1.59 | | | 4.59 |
| 12* | −9.828 | 0.27 | 1.84666 | 23.8 | 4.39 |
| 13* | 8.238 | | | | 4.44 |
| Image plane | ∞ | | | | |

Aspheric surface data

1st surface

| | | |
|---|---|---|
| K = 2.49294e+003 | A 4 = 5.14313e−004 | A 6 = 1.37152e−005 |

2nd surface

| | | |
|---|---|---|
| K = 1.72943e+000 | A 4 = −3.19457e−005 | A 6 = −4.67479e−005 |

3rd surface

| | | |
|---|---|---|
| K = 7.81956e+000 | A 4 = −1.32351e−003 | A 6 = −5.42120e−004 |

4th surface

| | | |
|---|---|---|
| K = −8.23582e+000 | A 4 = −5.27734e−003 | A 6 = −1.33093e−004 |

5th surface

| | | |
|---|---|---|
| K = −1.16560e+000 | A 4 = −8.09713e−003 | A 6 = −8.42313e−004 |

6th surface

| | | |
|---|---|---|
| K = −5.27822e+000 | A 4 = −3.58577e−004 | A 6 = −1.98298e−004 |

8th surface

| | | |
|---|---|---|
| K = −4.98936e+001 | A 4 = −1.25074e−003 | A 6 = 6.10265e−005 |

9th surface

| | | |
|---|---|---|
| K = −1.03792e+000 | A 4 = −2.16114e−003 | A 6 = −1.75868e−004 |

10th surface

| | | |
|---|---|---|
| K = −3.32390e+001 | A 4 = −2.65627e−004 | A 6 = −6.41767e−004 |

11th surface

| | | |
|---|---|---|
| K = 6.74228e+000 | A 4 = −5.47112e−003 | A 6 = −1.67590e−004 |

12th surface

| | | |
|---|---|---|
| K = −2.98736e+001 | A 4 = −3.36785e−003 | A 6 = 4.90705e−004 |

13th surface

| | | |
|---|---|---|
| K = −1.22972e+001 | A 4 = 4.46111e−003 | A 6 = 1.43275e−004 |

Various types of data

| | |
|---|---|
| Focal length | 5.20 |
| F number | 2.88 |
| Field angle | 36.59 |
| Image height | 3.86 |
| Total lens length | 15.62 |
| BF | 3.32 |
| Entrance pupil plane position | 11.601196 |
| Relative entrance pupil plane position | 11.601196 |

Single lens data

| Lens | Starting surface | Focal length |
|---|---|---|
| 1 | 1 | −9.54 |
| 2 | 3 | 9.34 |
| 3 | 5 | −10.79 |
| 4 | 8 | 5.40 |
| 5 | 10 | 10.57 |
| 6 | 12 | −5.26 |

Telescopic monocular
Unit mm
Surface data

| Surface No. | r | d | nd | νd | Effective dia. |
|---|---|---|---|---|---|
| 1* | 7.931 | 0.61 | 1.49700 | 81.5 | 7.34 |
| 2* | 7.538 | 2.32 | | | 7.03 |
| 3* | 3.728 | 1.45 | 1.61800 | 63.3 | 5.35 |
| 4* | 101.521 | 0.53 | | | 4.91 |
| 5* | 7.198 | 0.83 | 1.80518 | 25.4 | 4.01 |
| 6* | 3.243 | 0.61 | | | 3.31 |
| 7 (diaphragm) | ∞ | 1.25 | | | 3.20 |
| 8* | −8.627 | 1.20 | 1.64000 | 60.1 | 3.39 |
| 9* | 27.150 | 1.29 | | | 4.12 |
| 10* | 7.355 | 1.31 | 1.59240 | 68.3 | 6.22 |
| 11* | 19.105 | 2.20 | | | 6.32 |
| 12* | 5.912 | 0.67 | 1.84666 | 23.8 | 7.29 |
| 13* | 7.631 | | | | 7.14 |
| Image plane | ∞ | | | | |

Aspheric surface data

1st surface

| | | |
|---|---|---|
| K = 6.14105e−001 | A 4 = −3.92256e−004 | A 6 = −1.78500e−005 |

2nd surface

| | | |
|---|---|---|
| K = 7.88033e−001 | A 4 = −6.83587e−004 | A 6 = −4.77151e−005 |

-continued

3rd surface

| K = 1.57782e−001 | A 4 = 6.89830e−005 | A 6 = −1.62416e−005 |

4th surface

| K = 1.10268e+003 | A 4 = 2.31776e−003 | A 6 = −3.74904e−005 |

5th surface

| K = −9.00772e+000 | A 4 = −2.19417e−003 | A 6 = 2.54214e−004 |

6th surface

| K = 1.79541e−001 | A 4 = −9.27279e−003 | A 6 = 4.59708e−004 |

8th surface

| K = 1.46369e+001 | A 4 = 4.48128e−003 | A 6 = −9.99454e−004 |

9th surface

| K = 1.13709e+002 | A 4 = 6.11569e−003 | A 6 = −8.31429e−004 |

10th surface

| K = 9.58022e−001 | A 4 = −2.03991e−004 | A 6 = 1.57390e−005 |

11th surface

| K = −7.44708e+001 | A 4 = −1.59004e−003 | A 6 = 9.58368e−005 |

12th surface

| K = −2.06535e+000 | A 4 = −1.80843e−003 | A 6 = 1.00525e−004 |

13th surface

| K = 1.81097e+000 | A 4 = −3.18275e−003 | A 6 = 9.77152e−005 |

Various types of data

| | |
|---|---|
| Focal length | 15.00 |
| F number | 2.88 |
| Field angle | 14.43 |
| Image height | 3.86 |
| Total lens length | 17.42 |
| BF | 3.15 |
| Entrance pupil plane position | 10.101506 |
| Relative entrance pupil plane position | 10.101506 |

Single lens data

| Lens | Starting surface | Focal length |
|---|---|---|
| 1 | 1 | −627.20 |
| 2 | 3 | 6.23 |
| 3 | 5 | −8.09 |
| 4 | 8 | −10.10 |
| 5 | 10 | 19.38 |
| 6 | 12 | 26.27 |

Numerical Embodiment 5

Wide monocular
Unit mm
Surface data

| Surface No. | r | d | nd | vd | Effective dia. |
|---|---|---|---|---|---|
| 1* | −42.685 | 0.54 | 1.72916 | 54.7 | 5.12 |
| 2* | 3.848 | 2.23 | | | 4.09 |
| 3* | 9.377 | 0.37 | 1.59240 | 68.3 | 3.60 |
| 4* | 371.413 | 1.22 | | | 3.54 |
| 5 (diaphragm) | ∞ | | | | 3.03 |
| 6* | 156.517 | 0.88 | 1.80518 | 25.4 | 3.08 |
| 7* | 15.022 | 0.40 | | | 3.54 |
| 8* | 10.981 | 0.79 | 1.64000 | 60.1 | 4.30 |
| 9* | −7.177 | | | | 4.40 |
| 10* | 6.578 | 1.66 | 1.59240 | 68.3 | 5.26 |
| 11* | −9.747 | 1.53 | | | 5.31 |
| 12* | 20.007 | 0.33 | 1.84666 | 23.8 | 4.43 |
| 13* | 4.733 | | | | 4.28 |
| Image plane | ∞ | | | | |

Aspheric surface data

1st surface

| K = −8.55197e+002 | A 4 = 1.41102e−003 | A 6 = 2.66503e−005 |

2nd surface

| K = 1.27150e+000 | A 4 = 3.95059e−004 | A 6 = −4.71456e−005 |

3rd surface

| K = 1.42647e+001 | A 4 = −2.69563e−003 | A 6 = −3.95568e−004 |

4th surface

| K = 2.61860e+004 | A 4 = 1.90416e−004 | A 6 = −1.03847e−004 |

6th surface

| K = −2.69983e+003 | A 4 = 6.52873e−004 | A 6 = 1.63440e−004 |

7th surface

| K = −5.28938e+001 | A 4 = 3.20245e−003 | A 6 = 2.63310e−004 |

8th surface

| K = −2.88027e+001 | A 4 = 3.28991e−003 | A 6 = −6.45505e−005 |

9th surface

| K = −1.61334e+000 | A 4 = −6.26639e−004 | A 6 = −4.95477e−005 |

10th surface

| K = −8.79083e+000 | A 4 = 2.19316e−003 | A 6 = −2.77147e−004 |

11th surface

| K = 1.70190e+000 | A 4 = −2.11778e−003 | A 6 = 1.56957e−005 |

12th surface

| K = −3.02825e+000 | A 4 = −8.74513e−003 | A 6 = 6.68462e−004 |

13th surface

| K = −3.55690e+000 | A 4 = 1.01223e−003 | A 6 = 6.70353e−004 |

Various types of data

| | |
|---|---|
| Focal length | 5.20 |
| F number | 2.88 |
| Field angle | 36.62 |
| Image height | 3.87 |
| Total lens length | 16.40 |
| BF | 4.90 |
| Entrance pupil plane position | 13.975179 |
| Relative entrance pupil plane position | 13.975179 |

Single lens data

| Lens | Starting surface | Focal length |
|---|---|---|
| 1 | 1 | −4.82 |
| 2 | 3 | 15.45 |
| 3 | 6 | −20.69 |
| 4 | 8 | 6.90 |
| 5 | 10 | 6.89 |
| 6 | 12 | −7.39 |

Telescopic monocular
Unit mm
Surface data

| Surface No. | r | d | nd | vd | Effective dia. |
|---|---|---|---|---|---|
| 1* | 37.958 | 1.22 | 1.72916 | 54.7 | 6.88 |
| 2* | 125.307 | 1.34 | | | 6.56 |
| 3* | 13.875 | 2.59 | 1.59240 | 68.3 | 6.03 |
| 4* | −9.575 | 0.94 | | | 5.30 |
| 5 (diaphragm) | ∞ | | | | 4.24 |
| 6* | −14.533 | 1.04 | 1.80518 | 25.4 | 4.22 |
| 7* | 60.932 | 0.24 | | | 4.24 |
| 8* | 5.473 | 1.19 | 1.64000 | 60.1 | 4.51 |

-continued

| | | | | | |
|---|---|---|---|---|---|
| 9* | 4.499 | | | | 4.20 |
| 10* | 7.099 | 2.17 | 1.59240 | 68.3 | 5.01 |
| 11* | 5.426 | 1.17 | | | 5.35 |
| 12* | 6.434 | 1.30 | 1.84666 | 23.8 | 6.15 |
| 13* | 6.804 | | | | 5.96 |
| Image plane | ∞ | | | | |

Aspheric surface data

1st surface

K = −9.61310e+001   A 4 = −5.98873e−004   A 6 = −2.17801e−006

2nd surface

K = 4.98200e+002   A 4 = 1.52560e−004   A 6 = 1.41554e−005

3rd surface

K = −1.18259e+001   A 4 = 1.13037e−003   A 6 = −2.34093e−005

4th surface

K = 7.95958e−001   A 4 = 7.96407e−005   A 6 = 3.94482e−006

6th surface

K = −8.41366e+001   A 4 = 2.42332e−003   A 6 = 7.60590e−006

7th surface

K = −9.00000e+001   A 4 = 4.80467e−003   A 6 = 7.24665e−005

8th surface

K = −1.00128e+001   A 4 = 6.60868e−003   A 6 = 1.56769e−004

9th surface

K = 9.98801e−001   A 4 = 1.67203e−004   A 6 = 5.66228e−004

10th surface

K = −4.51560e−001   A 4 = −7.39046e−004   A 6 = 8.21732e−006

11th surface

K = −5.94453e+000   A 4 = 1.07998e−003   A 6 = −1.74708e−004

12th surface

K = 1.97616e−001   A 4 = −3.18494e−003   A 6 = 1.86010e−004

13th surface

K = 2.18802e+000   A 4 = −4.28066e−003   A 6 = 1.54459e−004

Various types of data

| | |
|---|---|
| Focal length | 15.00 |
| F number | 2.88 |
| Field angle | 14.45 |
| Image height | 3.87 |
| Total lens length | 18.62 |
| BF | 3.88 |
| Entrance pupil plane position | 13.216379 |
| Relative entrance pupil plane position | 13.216379 |

Single lens data

| Lens | Starting surface | Focal length |
|---|---|---|
| 1 | 1 | 74.24 |
| 2 | 3 | 9.97 |
| 3 | 6 | −14.48 |
| 4 | 8 | −75.59 |
| 5 | 10 | −75.17 |
| 6 | 12 | 53.65 |

TABLE 1

| | CONDITIONAL EXPRESSION (7) | CONDITIONAL EXPRESSION (8) | CONDITIONAL EXPRESSION (9) |
|---|---|---|---|
| EMBODIMENT 1 | 0.00 | 0.00 | 0.00 |
| EMBODIMENT 2 | 0.000000143 | 0.000000800 | 0.00000114 |

TABLE 1-continued

| | CONDITIONAL EXPRESSION (7) | CONDITIONAL EXPRESSION (8) | CONDITIONAL EXPRESSION (9) |
|---|---|---|---|
| EMBODIMENT 3 | 0.0267 | 0.149 | 0.147 |
| EMBODIMENT 4 | 0.0179 | 0.100 | 0.129 |
| EMBODIMENT 5 | 0.00906 | 0.0506 | 0.0543 |

Each embodiment described above is only illustrative only, and when implementing the present disclosure, various modifications and changes can be made to each embodiment.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244431 filed Dec. 16, 2016, which is hereby incorporated by reference herein in its entirety.

What is claimed is:

1. An image pickup apparatus comprising:
an image pickup unit configured to perform photoelectric conversion of object images formed by a plurality of image pickup optical systems of different focal lengths, wherein the following conditional expression is satisfied:

$$\frac{|EP\text{max} - EP\text{min}|}{f_{tele35}} \leq 0.028,$$

where EPmax is a longest distance among distances from a reference image plane to each of entrance pupil planes of the plurality of image pickup optical systems, EPmin is a shortest distance among distances from the reference image plane to each of the entrance pupil planes of the plurality of image pickup optical systems, and $f_{tele35}$ is a 35 mm equivalent focal length of an image pickup optical system which has the longest focal length among the plurality of image pickup optical systems, and wherein the reference image plane is defined as an image plane most separated from an object side among the image planes of the plurality of image pickup optical systems.

2. The image pickup apparatus according to claim 1, wherein
the following conditional expression is satisfied:

(1−EPmin/EPmax)≤0.15.

3. The image pickup apparatus according to claim 1, further comprising an image processing unit configured to generate, using a plurality of first images of different field angles generated by the image pickup unit, a second image having a field angle different from field angles of the plurality of first images.

4. The image pickup apparatus according to claim 3, wherein the image processing unit generates the second image by composing an image obtained by trimming a part of a first image having a field angle greater than the field angle of the second image among the plurality of first images, and an image obtained by enlarging a first image having a field angle smaller than the field angle of the second image among the plurality of first images.

5. The image pickup apparatus according to claim 1, further comprising an image processing unit configured to generate information about a depth of an object using at least two images of different field angles generated by the image pickup unit.

6. The image pickup apparatus according to claim 1, wherein the image pickup unit includes an image pickup element which has a plurality of image pickup areas corresponding to each of the plurality of image pickup optical systems, or a plurality of image pickup elements corresponding to each of the plurality of image pickup optical systems.

7. The image pickup apparatus according to claim 1, wherein optical axes of the plurality of image pickup optical systems are parallel with one another.

8. An image pickup apparatus, comprising:
an image pickup unit configured to perform photoelectric conversion of object images formed by a plurality of image pickup optical systems of different focal lengths, wherein the following conditional expression is satisfied:

$$\frac{|EP\text{max} - EP\text{min}|}{f_{tele}} \le 0.15,$$

where EPmax is a longest distance among distances from a reference image plane to each of entrance pupil planes of the plurality of image pickup optical systems, EPmin is a shortest distance among distances from the reference image plane to each of the entrance pupil planes of the plurality of image pickup optical systems, and $f_{tele}$ is a focal length of an image pickup optical system which has the longest focal length among the plurality of image pickup optical systems, and wherein the reference image plane is defined as an image plane most separated from an object side among the image planes of the plurality of image pickup optical systems.

9. The image pickup apparatus according to claim 8, wherein the following conditional expression is satisfied:

(1−EPmin/EPmax)≤0.15.

10. The image pickup apparatus according to claim 8, further comprising an image processing unit configured to generate, using a plurality of first images of different field angles generated by the image pickup unit, a second image having a field angle different from field angles of the plurality of first images.

11. The image pickup apparatus according to claim 10, wherein the image processing unit generates the second image by composing an image obtained by trimming a part of a first image having a field angle greater than the field angle of the second image among the plurality of first images, and an image obtained by enlarging a first image having a field angle smaller than the field angle of the second image among the plurality of first images.

12. The image pickup apparatus according to claim 8, further comprising an image processing unit configured to generate information about a depth of an object using at least two images of different field angles generated by the image pickup unit.

13. The image pickup apparatus according to claim 8, wherein the image pickup unit includes an image pickup element which has a plurality of image pickup areas corresponding to each of the plurality of image pickup optical systems, or a plurality of image pickup elements corresponding to each of the plurality of image pickup optical systems.

14. The image pickup apparatus according to claim 8, wherein optical axes of the plurality of image pickup optical systems are parallel with one another.

\* \* \* \* \*